(12) United States Patent
Berthiaume et al.

(10) Patent No.: US 8,684,371 B2
(45) Date of Patent: Apr. 1, 2014

(54) SHOPPING CART, FRAME, BASKET AND PRODUCTION METHODS

(71) Applicant: Produits Cari-All, Inc., Montreal (CA)

(72) Inventors: Eric Berthiaume, St-Eustache (CA); Gilles Simard, Le Gardeur (CA); Richard Pare, Montreal (CA); Serge Nadeau, Montreal (CA)

(73) Assignee: Produits Cari-All Inc., Montreal-Est. (CA)

( * ) Notice: Subject to any disclaimer, the term of this patent is extended or adjusted under 35 U.S.C. 154(b) by 0 days.

(21) Appl. No.: 13/925,392

(22) Filed: Jun. 24, 2013

(65) Prior Publication Data

US 2013/0300076 A1    Nov. 14, 2013

Related U.S. Application Data

(62) Division of application No. 13/312,539, filed on Dec. 6, 2011, now Pat. No. 8,469,373, which is a division of application No. 12/340,276, filed on Dec. 19, 2008, now Pat. No. 8,096,564.

(60) Provisional application No. 61/008,296, filed on Dec. 20, 2007, provisional application No. 61/008,297, filed on Dec. 20, 2007, provisional application No. 61/008,300, filed on Dec. 20, 2007, provisional application No. 61/008,301, filed on Dec. 20, 2007, provisional application No. 61/008,302, filed on Dec. 20, 2007.

(51) Int. Cl.
*B62D 39/00* (2006.01)

(52) U.S. Cl.
USPC .............. 280/33.991; 280/33.997; 280/DIG. 4

(58) Field of Classification Search
USPC ......... 280/30, 33.991, 33.997, 47.34, DIG. 4; D34/12, 14, 17, 21
See application file for complete search history.

(56) References Cited

U.S. PATENT DOCUMENTS

| | | | | |
|---|---|---|---|---|
| 4,097,056 A | * | 6/1978 | Castellano | 280/47.35 |
| 6,641,147 B2 | * | 11/2003 | Werner | 280/33.991 |
| 6,705,623 B2 | * | 3/2004 | Nadeau et al. | 280/33.991 |
| 6,805,365 B2 | * | 10/2004 | Lantz | 280/33.991 |
| 6,981,708 B1 | * | 1/2006 | Tucker et al. | 280/33.992 |
| 7,780,902 B2 | * | 8/2010 | Pruitt et al. | 264/544 |

* cited by examiner

Primary Examiner — John Walters
(74) Attorney, Agent, or Firm — The Van Winkle Law Firm; David M. Carter

(57) ABSTRACT

The present invention includes a shopping cart frame with mounting bracket units connecting caster wheels and having a plate secured underneath the base with a caster pin receiving hole and spaced-apart flanges flanking the hole and abutting on the base; a shopping cart with a support bar between side uprights for forwardly propping up a primary basket and rearwardly hanging a secondary basket; a cart with a plastic basket having rear structural tubes sheathing the frame's side uprights and being secured thereto; a modular method of making different cart models by providing multiple sets of components with cooperating mounting surfaces for interconnection; a modular plastic basket with a hooked-on suspended tray and a channel-shaped overlay detachably snapped over the edge and tray; a one-piece molded plastic basket with independent branching tubular sections with different thicknesses; and an independent gas-assisted injection method for molding a one-piece plastic basket.

4 Claims, 26 Drawing Sheets

SHOPPING CART, FRAME, BASKET AND PRODUCTION METHODS

CROSS-REFERENCE TO RELATED APPLICATIONS

The application claims priority to U.S. patent application Ser. No. 13/312,539, now U.S. Pat. No. 8,469,373. This application is a divisional of U.S. patent application Ser. No. 12/340,276, filed on Dec. 19, 2008, now U.S. Pat. No. 8,096,564, which claims priority to five (5) U.S. Provisional Patent Applications filed on Dec. 20, 2007, i.e., Ser. No. 61/008,296, Ser. No. 61/008,297, Ser. No. 61/008,300, Ser. No. 61/008,301, and Ser. No. 61/008,302, the contents of all of which are incorporated herein by reference in their entireties.

FIELD OF THE INVENTION

The present invention pertains to the field of carts and more particularly to the field of frames, baskets, carts such as shopping carts and production methods thereof.

BACKGROUND

Shopping carts and other types of carts have been constructed in a variety of ways. Most known carts have a wheeled frame and a basket connected to the frame.

Carts have been known to have various disadvantages depending on their construction and production method. Some disadvantages that are prevalent in the field are inefficient use of plastic, metal and/or space; elevated pressure points on the basket or frame that may accelerate damage or wear; connection points that increase the chance of accumulation of food, liquids or other substances, and thus increase the chance of corrosion at the connection point while being generally unhygienic and difficult to clean; costly and/or lengthy manufacturing and assembling of the cart subcomponents; disadvantageous rigidity or deformation properties at certain locations; poor modularity, flexibility and cost-effectiveness especially due to fixing certain components or accessories directly to the rest of the cart; difficulty in interchanging components of different models or versions of carts due to shopping cart manufacturing practices of prefabricating model-specific components; limited maneuverability and leverage for a user desiring an efficient and varied displacement of the shopping cart; poor integration or removability of baskets or accessories with the rest of the cart; bulkiness or encumbering aspect of some subcomponents or accessories; and general operational deficiencies.

There is a need in the field for technology that can overcome at least some of the disadvantages of what is already known in the field.

SUMMARY OF THE INVENTION

The present invention responds to the above-mentioned need by providing a shopping cart, frame, basket, method of production.

In one aspect of the present invention, there is provided a frame for a shopping cart including a base having a front and a rear, comprising a pair of spaced-apart longitudinal tubular framing members. The frame has a pair of spaced-apart tubular side uprights each having a bottom portion mounted to the rear of the base and an upper portion extending upward from the base, caster wheel assemblies mounted to the base, and mounting bracket units for mounting the caster wheels to the base. Each one of the mounting bracket units is associated with a respective one of the caster wheel assemblies and includes a plate having a first portion secured underneath one of the tubular framing members and a second portion projecting away from said one of the tubular framing members. The second portion is mounted to a caster pin or caster plate, and has a caster pin receiving hole and a pair of spaced-apart flanges flanking the caster pin receiving hole and abutting said one of the tubular framing members.

In another aspect of the present invention, which may be combined with other aspects thereof, there is provided a shopping cart including a frame having a wheeled base, a pair of tubular side uprights each having a bottom portion mounted to a rear section of the base and an upper portion extending upward from the base, a handle bar mounted between the side uprights in the upper portion thereof, a support bar extending between the side uprights above the bottom portion thereof over the base, a primary basket mounted to the side uprights and extending in a forward direction, the primary basket having a rear bottom seating on the support bar; and a secondary basket removably hung to the support bar and extending below the primary basket in a rearward direction.

In another aspect of the present invention, which may be combined with other aspects thereof, there is provided a shopping cart including a frame having a wheeled base, a pair of side uprights each having a bottom portion mounted to a rear section of the base and an upper portion extending upward from the base, and a basket comprising a bottom floor, a front wall, two sidewalls and a tubular structural member framing a rear end of each of the two sidewalls, each tubular structural member slidably sheathing a corresponding one of said side uprights. There are also securing means for securing the structural members to the side uprights, and a handle assembly mounted between the side uprights in the upper portion thereof.

In yet another aspect of the present invention, which may be combined with other aspects thereof, there is provided a modular method of manufacturing different shopping cart models. The method includes providing multiple sets of base modules, each base module comprising a pair of spaced-apart longitudinal tubular framing members, each framing member having a rear comprising an upward-facing mounting surface, the base modules of each set having a different pre-determined width between the longitudinal tubular framing members and/or a different pre-determined length of the longitudinal tubular framing members. The method also includes providing at least one set of tubular side uprights, each tubular side upright comprising an upper portion and a bottom portion that has a downward-facing mounting surface. The method further includes selecting a base module from each of the different sets thereof and, for each selected base module, selecting a pair of tubular side uprights from any one of the at least one set thereof. The method also includes, for each selected base module, aligning the mounting surfaces of the selected pair of tubular side uprights with the respective mounting surfaces of the selected base module, and securing the mounting surfaces together so that the upper portions of the selected tubular side uprights extend upward from the base module in parallel relation to each other. Finally, for each selected base module, at least one shopping cart basket is mounted to the tubular side uprights.

In still another aspect of the present invention, which may be combined with other aspects thereof, there is provided a modular plastic shopping cart basket having opposed side walls, a front wall and a bottom, and an upper edge extending along the side walls and the front wall; the upper edge having a given thickness. There is a channel-shaped overlay covering at least a portion of the upper edge, the overlay being in a detachably snapped-on relationship with the portion of the upper edge. The overlay also has a generally U-shaped cross-section fitting on the portion of the upper edge and is sized so as to provide a gap between the overlay and an outer surface of the portion of the upper edge when the overlay is snapped onto the portion. The portion of the upper edge has at least one zone of connection having a smaller thickness than said given thickness. There is also a tray having a rim provided with at least one hook connectable to said at least one zone of connection to suspend the tray from the upper edge, said rim with the at least one hook being sized to fit in said gap.

In another aspect of the present invention, which may be combined with other aspects thereof, there is provided a molded shopping cart basket having a one-piece structure made of injection molded plastic. The basket includes tubular zones of hollowed plastic, each tubular zone having an annular cross-section with a peripheral wall. Each tubular zone includes a main tubular section with opposed ends, and at least first and second branching tubular sections connected to one of the ends of the main tubular section in a bifurcated relationship. The peripheral wall of the first branching section has a greater thickness than the peripheral wall of the second branching section.

In yet another aspect of the present invention, which may be combined with other aspects thereof, there is provided a method for injection molding a one-piece plastic shopping cart basket. The method includes providing a mold having a cavity in the shape of the shopping cart, the mold comprising a gas inlet and at least first and second gas outlets, the cavity having a tubular-zone making portion in fluid communication with the gas inlet and the gas outlets. The method also includes ensuring the gas inlet and the gas outlets are closed, then injecting molten plastic within the cavity. The method then includes allowing the molten plastic to partially solidify in the tubular zone-making portion of the cavity to form a solidified tubular zone having an annular cross-section and a peripheral wall; injecting a gas into the inlet and opening the first gas outlet, to expel the remaining molten plastic from within a section of the tubular zone to form a first tubular section having a given thickness; opening the second outlet to allow the injected gas to expel the remaining molten plastic within another section of the tubular zone to form a second tubular section having a peripheral wall with a thickness greater than the given thickness; and permitting the plastic remaining in the mold to solidify to form the basket. The steps of opening the first and second outlets may be done sequentially or simultaneously while having different flow rates of molten plastic out from each outlet.

DETAILED DESCRIPTION OF THE PREFERRED EMBODIMENTS it should be understood that the present invention pertains to various aspects of carts, frames, baskets and methods to produce them. The illustrated embodiments pertain more particularly to shopping carts, but various similar types of carts are also envisioned within the ambit of the present invention.

Referring to FIGS. 1, 2, and 26-30, various embodiments of an assembled shopping cart 30 are illustrated. The shopping cart 30 generally includes a frame 32 and a basket 34, various embodiments of which will be described in greater detail herein below.

Figure 1:
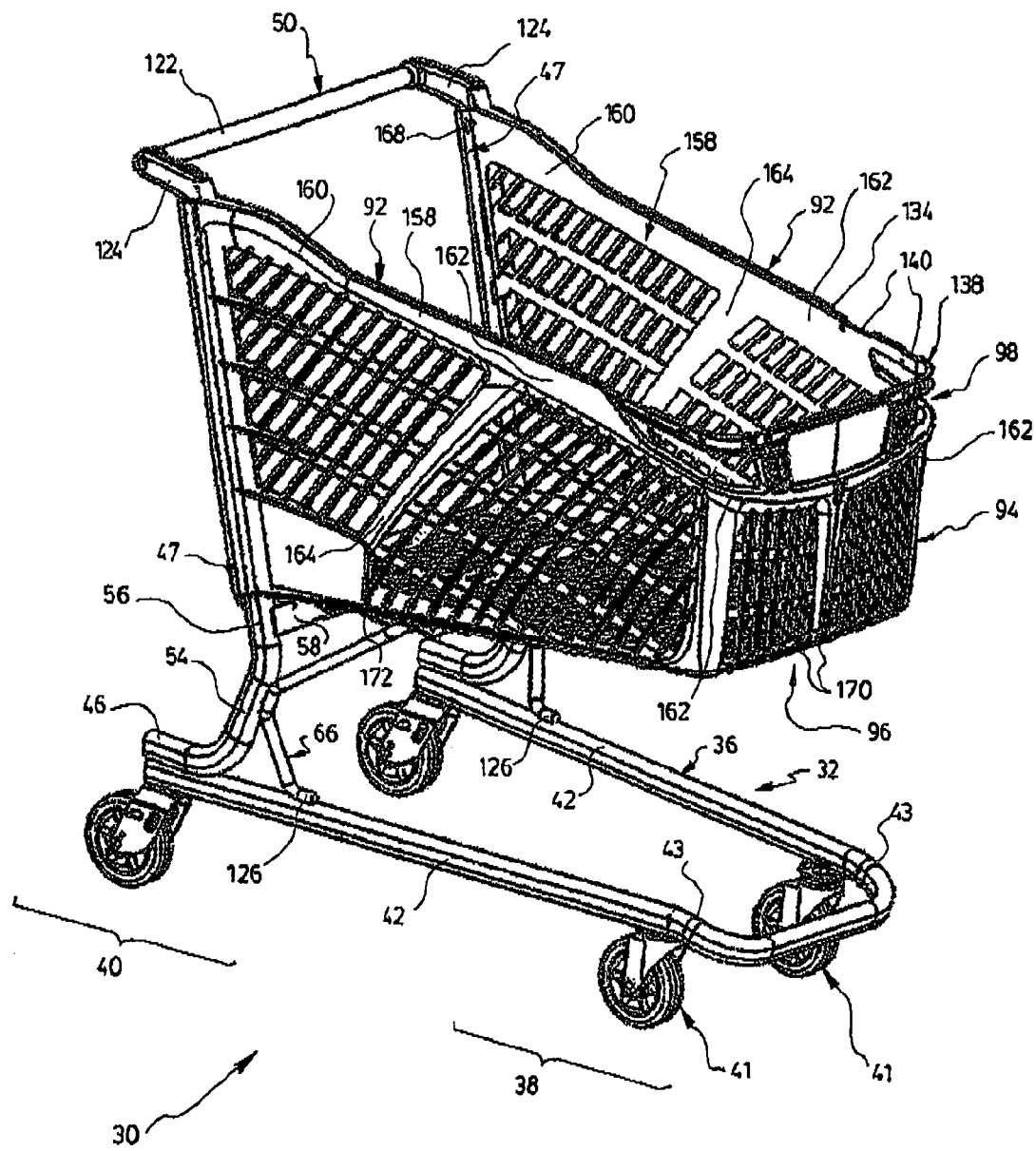
FIG. 1 is a top front perspective view of a shopping cart according to one embodiment of the present invention.
Figure 2:
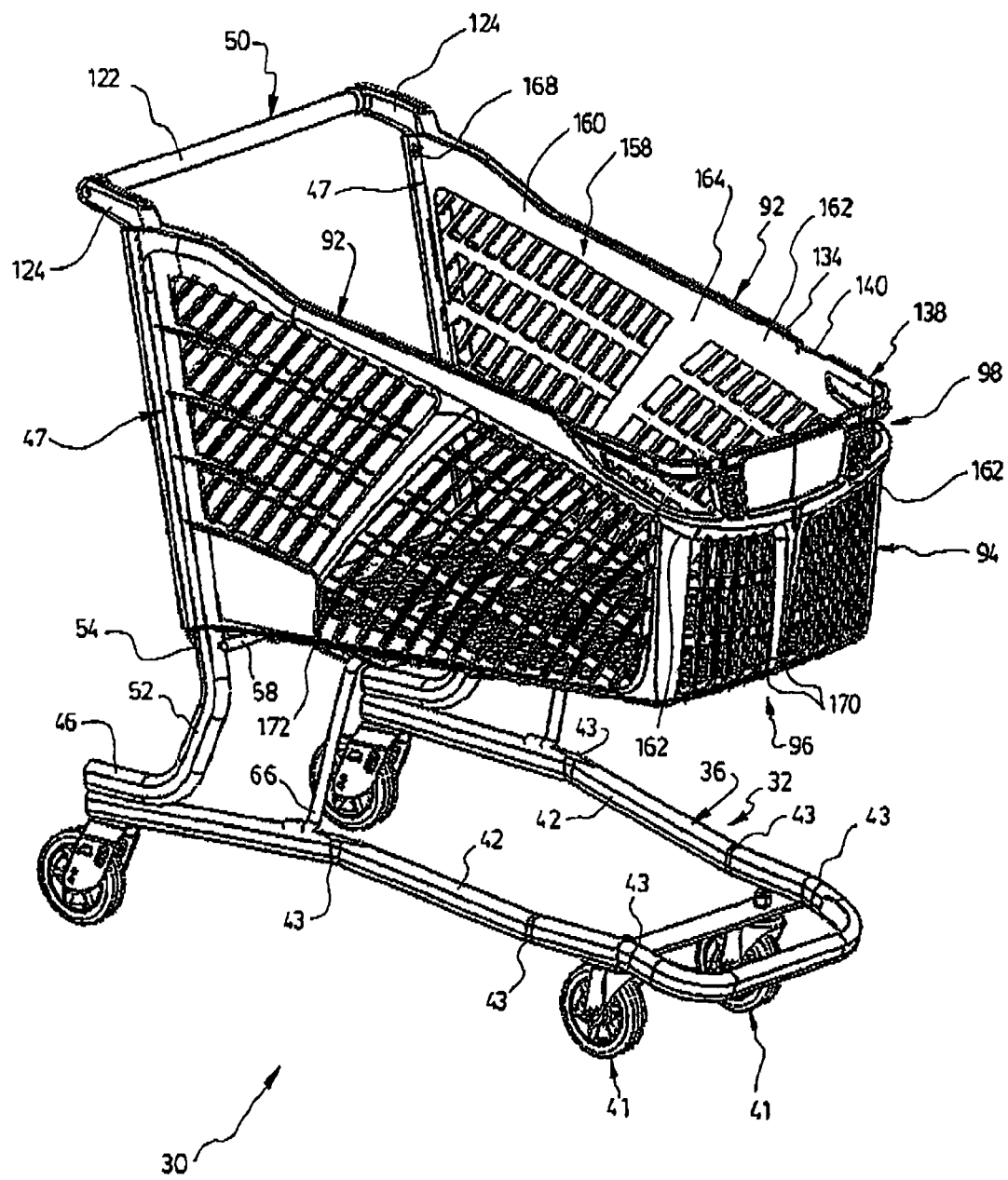
FIG. 2 is a top front perspective view of a shopping cart according to another embodiment of the present invention.

Referring to FIGS. 1-5, 24, and 26-30, the cart frame 32 includes a base 36 that has a front 38 and a rear 40. The frame 32 also includes caster wheel assemblies 41 or other types of wheel arrangements mounted to the base 36. The base may be generally U-shaped viewed from above and be generally aligned with the ground. The base 36 may have an open-ended rear 40 and a close-ended front 38. The tubular base 36 tapers inwardly toward the front 38 and includes two opposed longitudinal tubular framing members 42. FIG. 1 shows an embodiment of the base 36 that has been vertically bent to have a single pair of opposed bends 43; FIG. 2 shows another embodiment having three pairs of bends 43 as described more fully in U.S. patent application Ser. No. 12/135,301, which is incorporated herein by reference.

Figure 3:
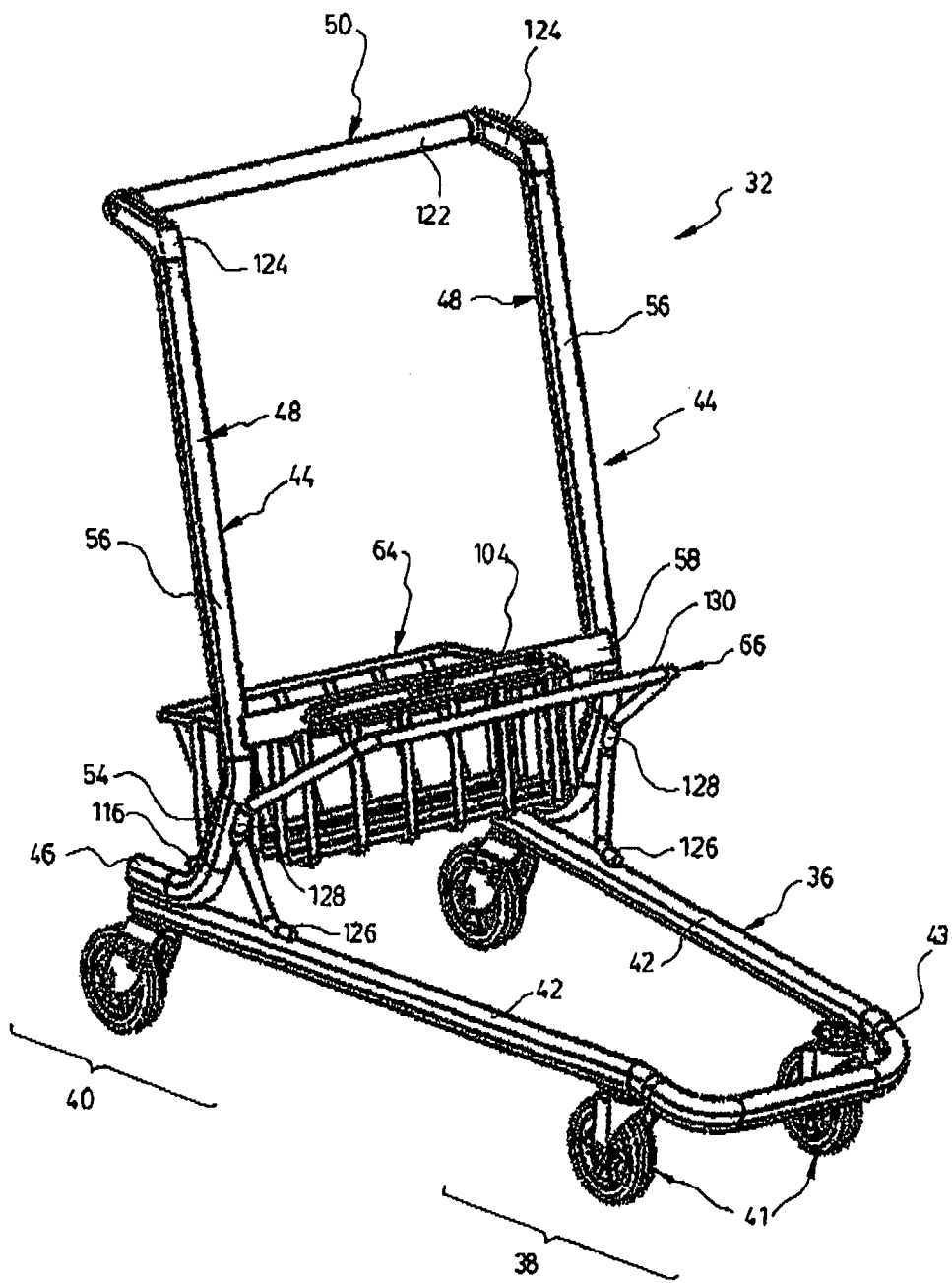
FIG. 3 is a top front perspective view of a frame of the shopping cart of FIG. 1.

Referring to FIG. 3, the frame 32 also includes a pair of spaced-apart tubular side uprights 44 each having a bottom portion 46 mounted to the rear 40 of the base 36 and an upper portion 48 extending upward from the base 36. The frame 32 also includes a handle 50 mountable between the upper portions 48 of the side uprights 44.

Figure 6:
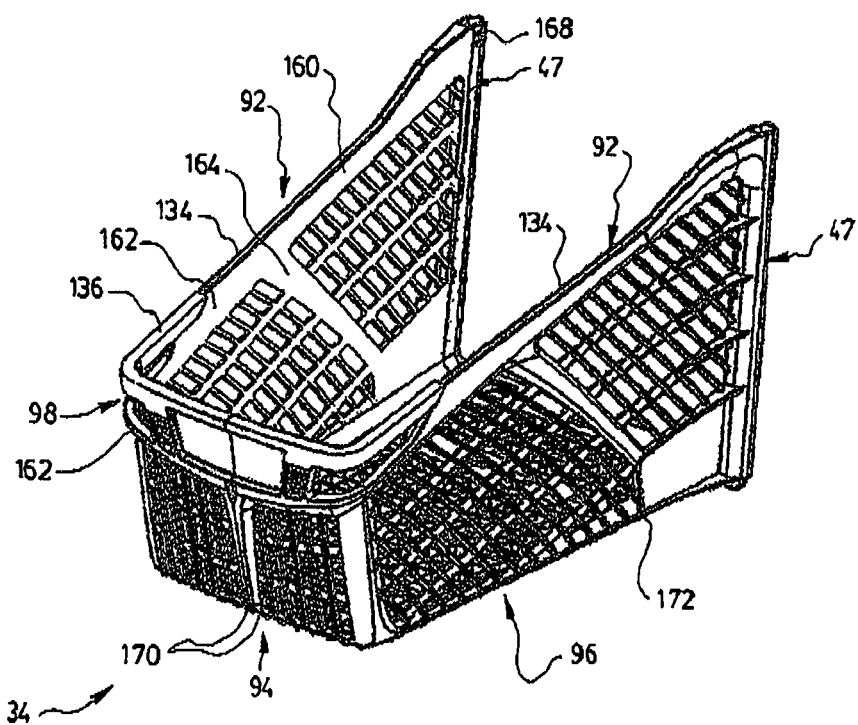
FIG. 6 is a top front perspective view of a basket according to one embodiment of the present invention.
Figure 7:
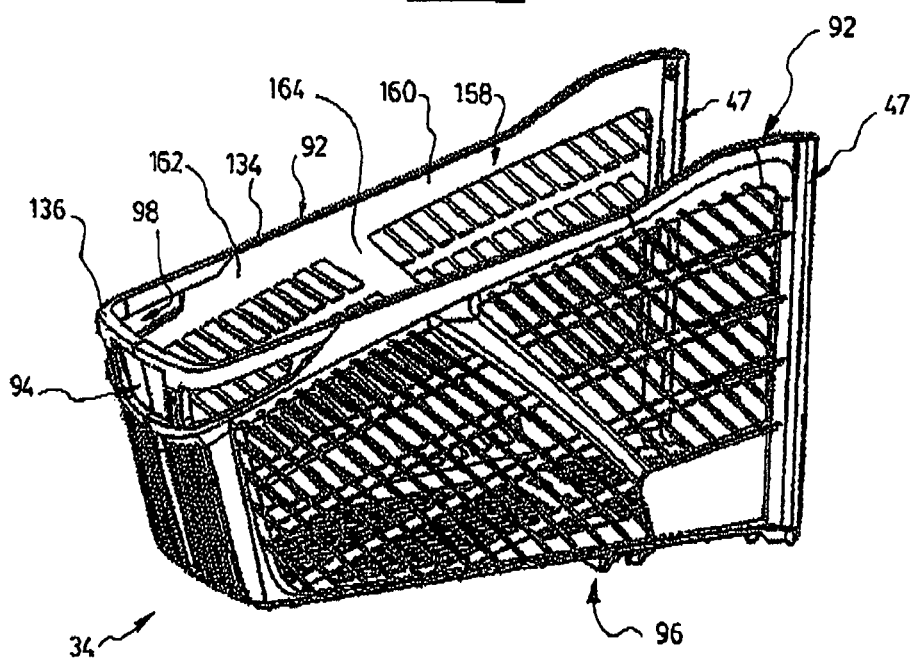
FIG. 7 is a top side perspective view of the plastic basket of FIG. 6.
Figure 8:
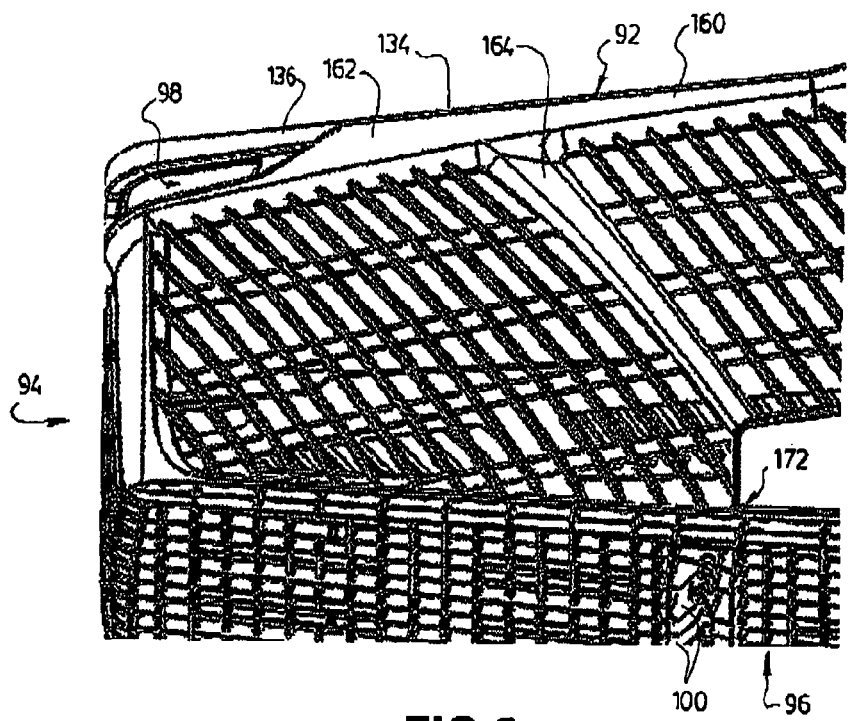
FIG. 8 is a bottom side perspective view of the plastic basket of FIG. 6.

Referring briefly to FIGS. 6 and 7, the basket 34 may be plastic and have two spaced-apart tubular structural members 47 at its rear end, which may be mounted to the frame by slidably sheathing over the side uprights.

Figure 26:
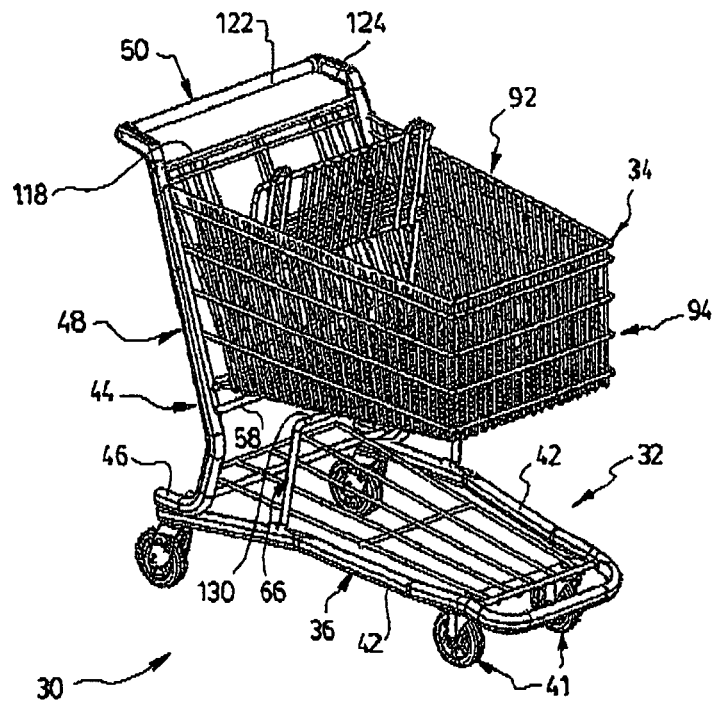
FIG. 26 is a top front perspective view of a shopping cart with a metal basket according to another embodiment of the present invention.
Figure 27:
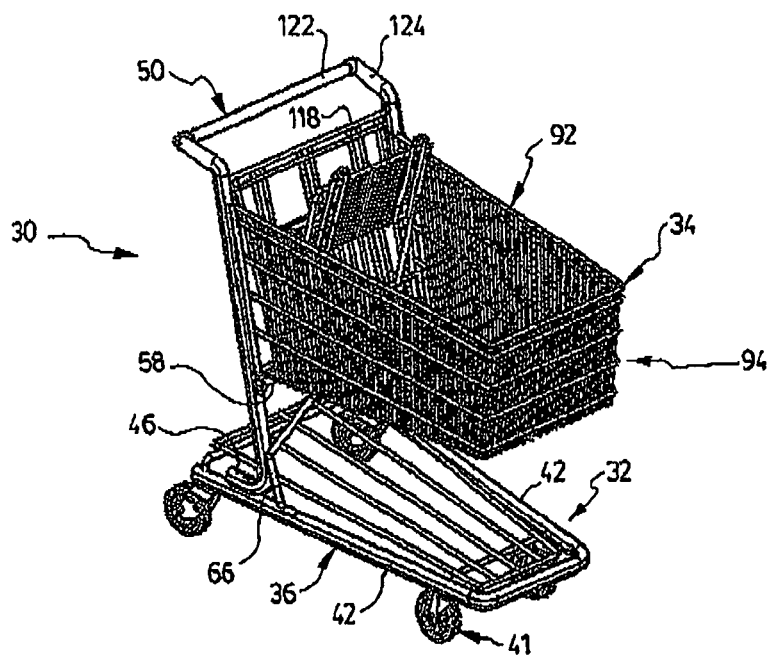
FIG. 27 is a top front perspective view of a shopping cart with a metal basket according to yet another embodiment of the present invention.

Referring to FIGS. 26 and 27, a metallic basket 34 is shown mounted to the frame 32 not via tubular members but by attachment points along the side uprights 44 and at other locations. It should be noted that the basket may alternatively be secured or mounted to the frame in other ways in connection with other embodiments of the present invention.

Referring back to FIG. 3, in one optional embodiment each side upright 44 is a one-piece structure made of steel or the like. The bottom portion 46 of each one-piece side upright 44 consists of a horizontal segment secured to the base 36. Each upright 44 also includes a forward slanting segment 54 extending upward from a frontward end of the horizontal segment 46 and a rearward slanting segment 56 extending upward from an upper end of the forward slanting segment 54. The shape and configuration of the side uprights 44 enable various functions such as supporting the basket, efficient use of material and space, efficient manufacturing and assembly with other components and/or improved functionality for the user. The rearward slanting segment 56 is preferably the one inserted within the tubular structural members of the plastic basket.

Figure 17:
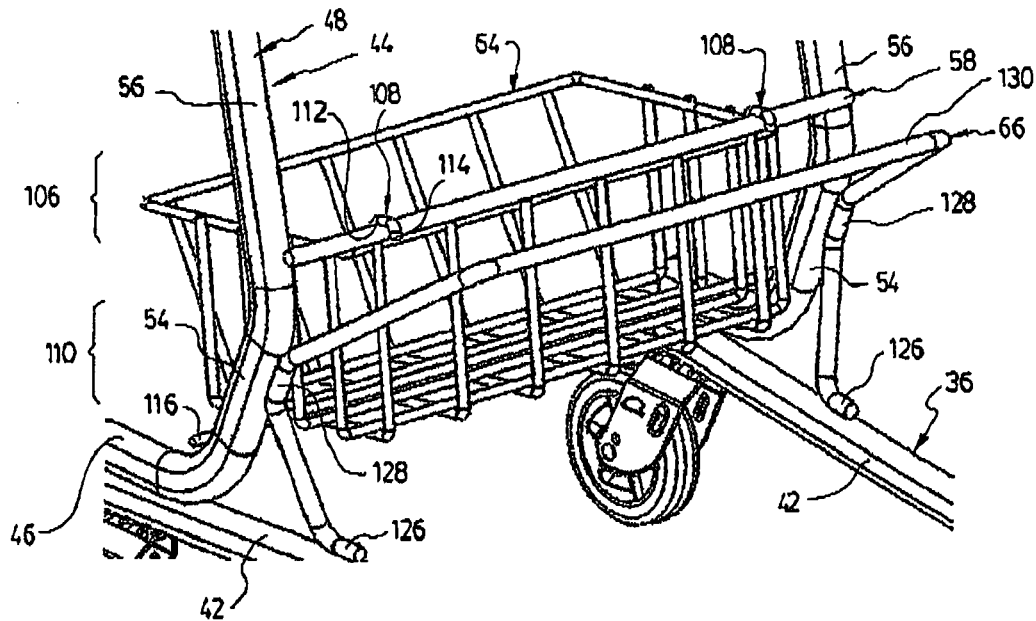
FIG. 17 is a top front perspective view of part of the back of the frame of the cart, according to another embodiment of the present invention.
Figure 18:
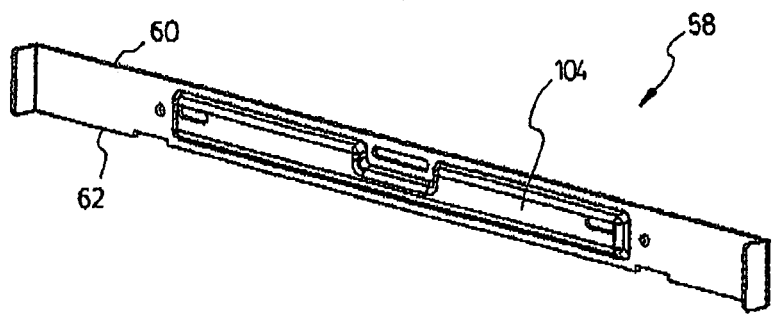
FIG. 18 is an isolated perspective view of a support bar according to one embodiment of the present invention.
Figure 19:
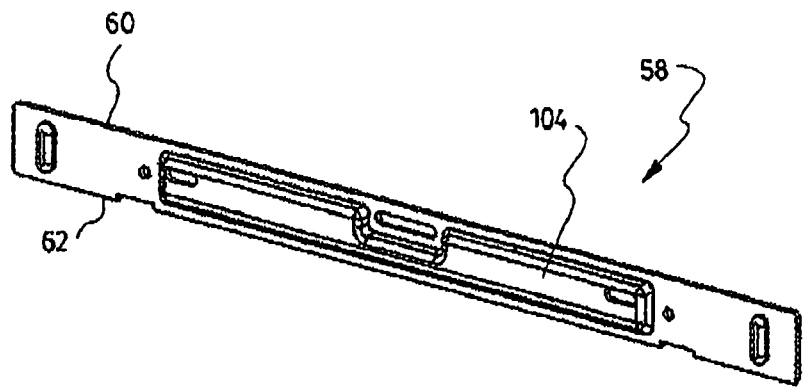
FIG. 19 is a perspective isolated view of a support bar according to another embodiment of the present invention.

The frame 32 may also include a support bar 58 mounted between the side uprights 44 to support the basket from below. In one embodiment as illustrated in FIGS. 2, 5, 17, 21, 26 and 28-30 the support bar 58 is a cylindrical rod. In another embodiment as illustrated in FIGS. 1, 3, 4, 16, 18, 19, 20, 22, 24 and 27, the support bar is a flat strip. FIGS. 18 and 19 show that the strip-shaped support bar 58 includes an upward-facing edge 60 and downward-facing edge 62 and opposed surfaces.

Referring to FIG. 1, the support bar 58 may support the rear end of a primary basket 34 from below so that the primary basket 34 extends in a forward direction. Referring to FIGS. 3, 4, 16 and 17, the support bar 58 may at the same time allow a secondary basket 64 to be removably hung therefrom. The primary basket extends forwardly and the secondary basket extends below the primary basket in a rearward direction. This arrangement allows improved orientation of the baskets and their openings relative to each other, efficiency of space and facility of use for a shopper. More regarding the secondary basket and its connection to the support bar will be discussed herein below.

Referring to FIGS. 1-5, 16-17, 20-24, and 26-27, the frame 32 may also include an intermediate support 66 mounted to the base 36 forward of the tubular side uprights 44 to support the bottom of the basket from below. There are two illustrated embodiments of the intermediate support 66. One embodiment is shown is FIGS. 1, 3-5, 16, 20, 22, 24 and 27 and the other is shown in FIGS. 2, 17, 21, 23, 26 and 18-30.

The support bar 58 and the intermediate support 66 will be further discussed below in relation to mounting the baskets to the frame in order to assemble the shopping cart.

Figure 14:
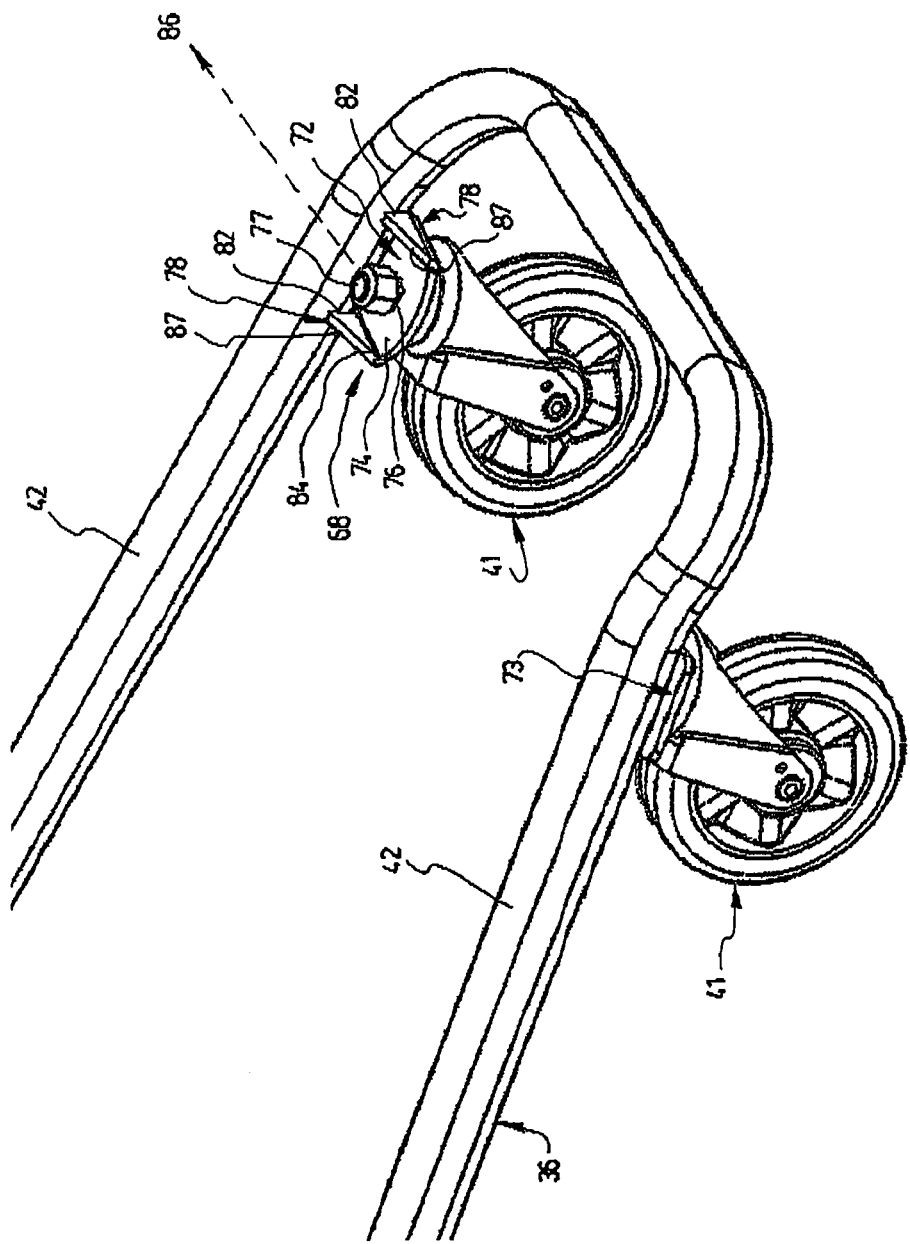
FIG. 14 is a top front perspective view of the front of the frame of the cart, showing a mounting bracket unit according to one embodiment of the present invention.
Figure 15:
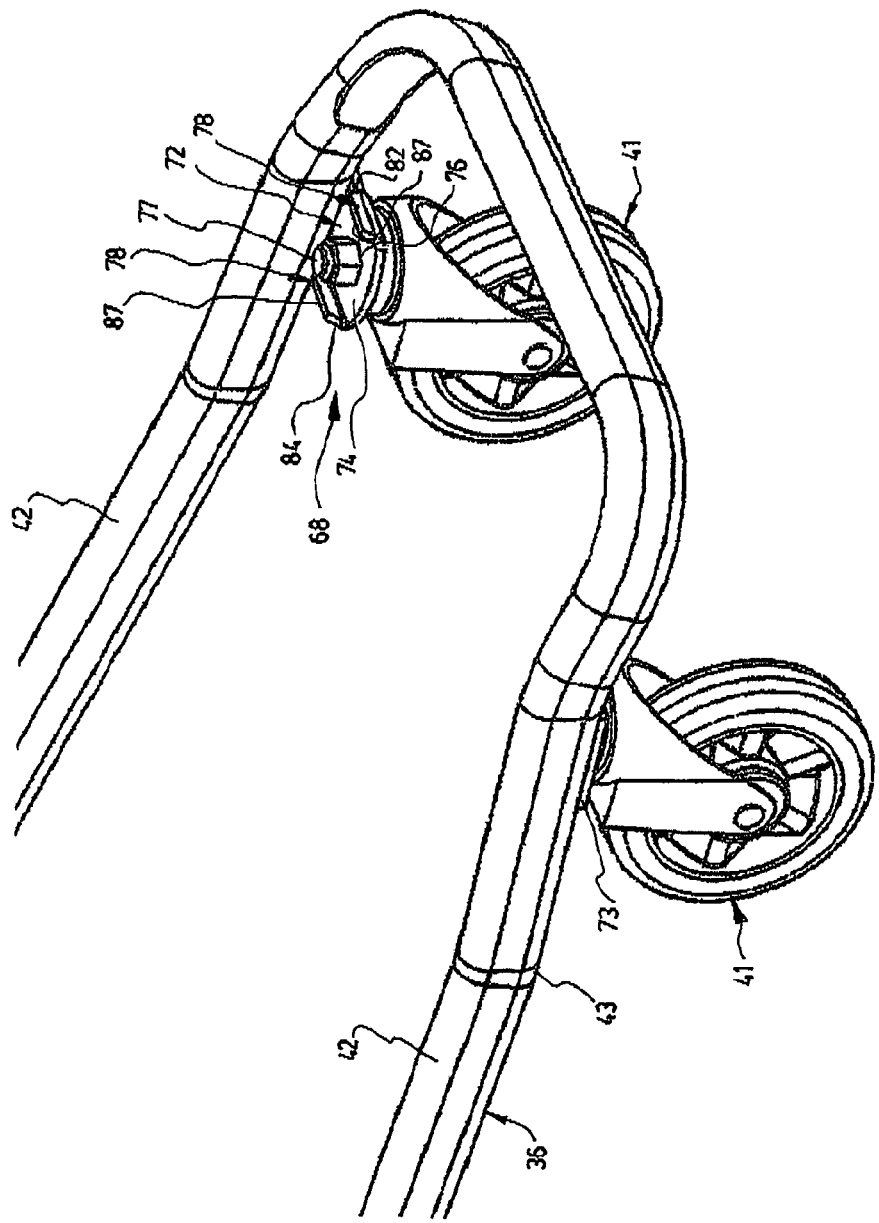
FIG. 15 is a top front perspective view of the front of the frame of the cart, showing a mounting bracket unit according to another embodiment of the present invention.

Referring to FIGS. 14 and 15, the frame 32 also includes mounting bracket units 68 for mounting caster wheel assemblies 41 to the base 36. In one embodiment, each mounting bracket unit 68 is associated with a respective one of the caster wheel assemblies. The mounting bracket unit 68 includes a plate 72 having a first portion 73 secured underneath one of the tubular framing members 42 and a second portion 74 projecting away from the tubular framing member 42. The first portion 73 may be welded or otherwise secured to the framing member 42. The second portion 74 preferably has a hole 76 for receiving and rotatably securing a caster pin 77. The mounting bracket unit 68 also has a pair of spaced-apart flanges 78 flanking the caster pin receiving hole 76 of the caster plate and abutting on the tubular framing member 44 to which the first portion 73 is secured. Preferably, the flanges 78 are parallel to each other and in perpendicular relationship to the tubular framing member 42. This may improve the structure's solidity, its manufacturing efficiency, and the connection to straight parts of the tubular framing members 42. The plate 72 and the pair of flanges 78 are preferably a one-piece structure. For instance, the flanges 78 may be formed by bending a piece of metal on either side.

The second portion 74 of each flange 78 preferably includes a first end 82 abutting and being secured to the tubular framing member 42 and a second end 84 remote from the same framing member 42. The first end 82 may have a shape corresponding to the framing member 42, be it straight or curved or another shape.

Each mounting bracket unit 68 is compact and connected to a single one of the tubular framing members 42 while being remote from the opposite framing member 42. This compact structure improves the assemblage, the efficiency of material use and/or the interchangeability and adaptability to different parts of the base. It also offers reduced bulkiness. Each mounting bracket 68 may also be symmetrical along a central axis 86 parallel to the flanges 78. The first ends 82 may also be perpendicular to the second portion 74 of the plate, especially when the tubular framing member 42 is rectangular in cross-section for improved alignment.

As mentioned above, the flanges 78 are preferably secured to the tubular framing member 42. The flanges 78 help align the bracket unit 68 against the tubular framing member 42 while they and the first portion 73 of the plate 72 are connected by welding for example. The flanges 78 then buttress the mounting bracket unit 68 and the caster wheel assembly against shocks, increase the strength of the unit itself, and generally improve the wheel mounting and its operation.

Referring to FIG. 14, each flange 78 may also have an upper edge 87 that slopes downward from the first end 82. This construction further decreases the weight and material of the component while allowing abutment against the tubular framing member 42. The upper edges 87 may also function to support a lower rack or basket (not illustrated) and the sloped angle may facilitate cradling of the lower rack or basket while allowing easy removal or replacement.

Referring to FIG. 15, the upper edge 87 of each flange 78 may alternatively be generally parallel to the second portion 74 of the plate 72.

Furthermore, the mounting bracket unit can have the nut welded directly to the plate to facilitate assembly with the pin of the caster wheel assembly. It may also have various additional folds, flanges, holes or embossments to increase strength in predetermined directions or improve drainage.

In the figures, there are two main embodiments of the primary shopping cart basket 34. FIGS. 1-2, 6-12, 20-23 and 25 pertain to the first embodiment of a molded plastic shopping cart basket. FIGS. 24 and 26-30 pertain to the second embodiment of a metallic basket.

Referring to FIGS. 1-2 and 6-7, the first embodiment of the shopping cart basket 34 includes opposed side walls 92, a front wall 94 and a bottom floor 96 defining a cavity.

Referring to FIGS. 1-2 and 6-12, in one optional embodiment of the plastic basket 34, there are slots 98 provided through the side and front walls at the top front corners, and are sized to allow passage of user's hand. The slots 98 may be used as handles for displacing the shopping cart. The location of the slots 98, spanning both the front and side walls, ameliorates displacement ability in different directions, as a user can slide their hand within the slot(s) from one side to the other in order to easily pull, push or spin the cart.

Referring to FIG. 1, the primary basket 34 is shown mounted to the frame 32. The tubular structural members are slid over the rearward slanting segments of the tubular side uprights 44, and the bottom floor is seating on the support bar 58.

Figure 20:
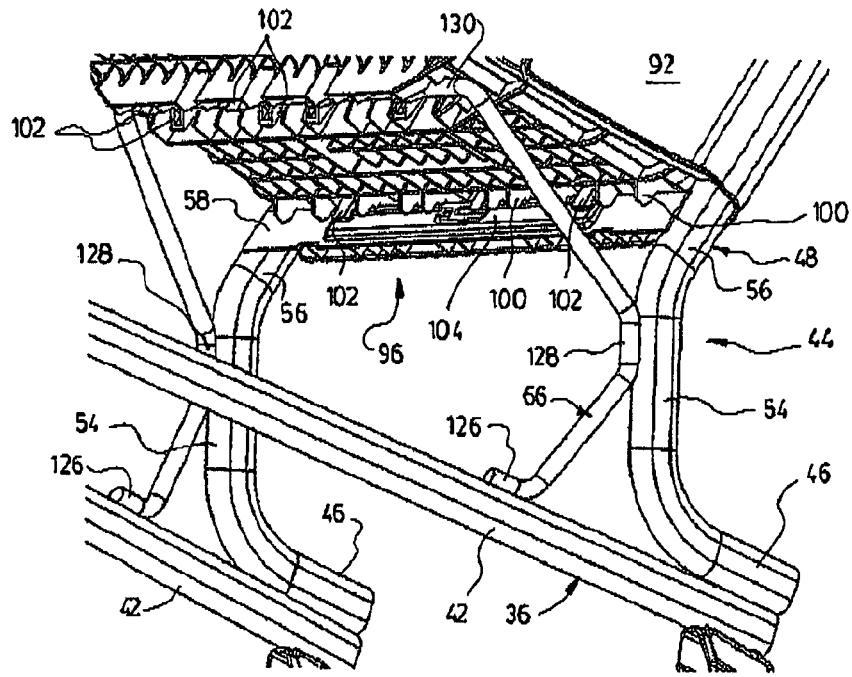
FIG. 20 is a bottom front perspective view of part of the back of the shopping cart according to one embodiment of the present invention.

FIG. 20 illustrates that the bottom floor of the basket 34 may include a series of downward-extending ridges 100 for guiding the basket 34 onto the support bar 58 and abutting on its sides. The ridges 100 are preferably V-shaped and facilitate removable mounting on the support bar. The bottom of the basket may also include clamping means that may take the form of pairs of opposed engaging elements 102 each having protuberant ends. The engaging elements 102 of each pair may be directly opposed to each other or off-set laterally and are preferably resilient. The engaging elements 102 enable the primary basket to be removably secured by snap-action engagement with the support bar 58.

Figure 21:
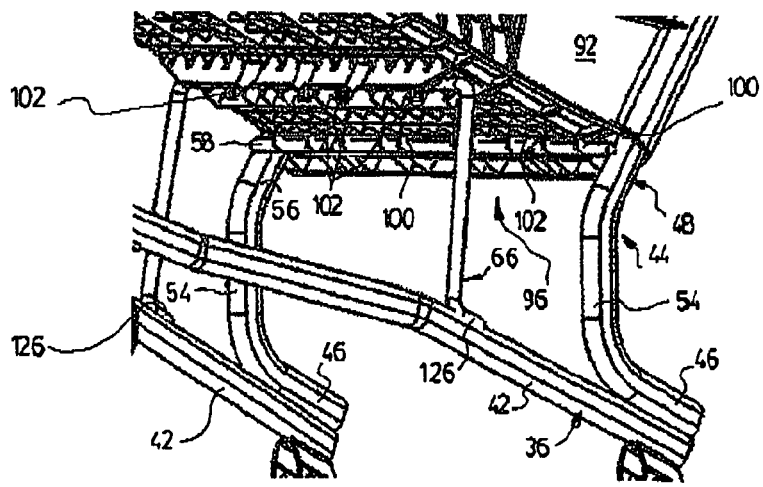
FIG. 21 is a bottom front perspective view of part of the back of the shopping cart according to another embodiment of the present invention.

Referring to FIG. 21, when the support bar 58 is rod-shaped, it is snapped in between the engaging elements 102 so that the protuberant ends enclose around its lower surface.

Referring to FIGS. 18-20, when the support bar 58 is strip-shaped, it may be provided with an indentation 104. As shown in FIG. 20, the indentation 104 allows connection particularly with the engaging elements 102, as the protuberant ends fit or snap into the indentation 104. There may alternatively be a single engaging element 102 on just one side relative to the strip-shaped support bar 58 for fitting or snapping into the indentation 104.

Referring to FIGS. 3, 4, 16 and 17, the frame 32 preferably has a secondary basket 64 attached to it via the support bar 58. It should be understood that "secondary basket" means a mechanism capable of carrying an item on the shopping cart. The secondary basket may be designed with a particular item in mind. The secondary basket may be a four-sided container as illustrated or a series of brackets defining an empty space for carrying bottles or the like. Although not explicitly illustrated, it should also be understood that the primary basket and the secondary basket are preferably both mounted to the frame to form a double-basket cart.

Preferably, the secondary basket 64 is accommodated in the lower C-shaped nook created by the shape of the tubular side uprights 44. This may perhaps be best appreciated in FIG. 4. The size of the nook depends on the length of the bottom portion 46 and the length and angle of the forward and rearward slanting segments 54, 56. Preferably, the secondary basket 64 is sized to fit in between the side uprights 44 and to extend rearwardly. In this way, the secondary basket is viewable and accessible to a user, while providing space to the user to extend their feet when walking. The rearward slanting segments 56 of the side uprights 44 extend to a position so that the handle 50 is easily graspable by a user.

Preferably, the primary basket is upwardly spaced apart from the front of the base to create a space therebetween capable of receiving the secondary basket of a preceding shopping cart when two carts are nested together. Such nesting ability ameliorates the spatial efficiency of nestable shopping carts.

Figure 16:
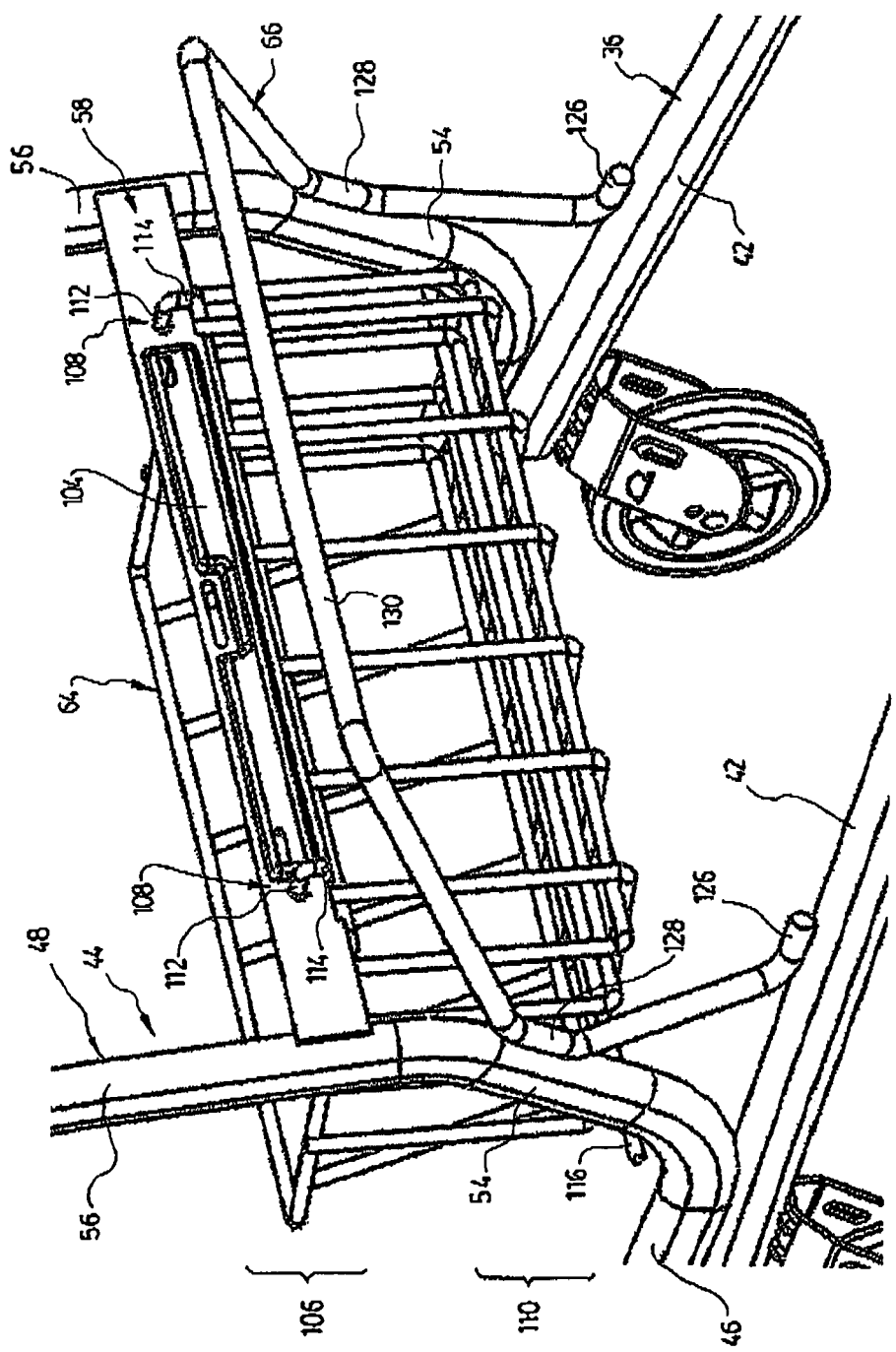
FIG. 16 is a top front perspective view of part of the back of the frame of the cart, according to one embodiment of the present invention.

Referring to FIG. 16, the secondary basket 64 may have an upper part 106 with multiple connectors 108 projecting in a forward direction for resting on the support bar 58, and a lower part 110 raised off the ground, preferably at a distance allowing a preceding shopping cart base to pass underneath it when nested. Preferably, the connectors removably connect the secondary basket. Each connector 108 includes a straight portion 112 extending forward and a catch portion 114 extending downward from the straight portion 112 in front of the support bar 58 when mounted thereto. The connectors 108 may suspend the secondary basket 64 to be pivotal, in which case there may be a stop element 116 to abut against the tubular side uprights 44 to resist forward pivoting. The stop element 116 preferably rests on the forward-slanting segments 54 of the uprights. The stop element 116 preferably takes the form of a rod sized to extend laterally beyond either side of the secondary basket 64 to abut on respective side uprights 44. The one-piece rod is easily constructed and integrated into construction, yet the stop element 116 may also be formed of a variety of means that are fixed to the basket 64 or the uprights 44 for abutment on the other. The basket 64 may be tilted backward thus exposing its opening to facilitate access to a user. The position of the stop element 116 may be adjusted to vary the tilt angle of the secondary basket 64. Preferably, the space below the primary basket allows the secondary basket 64 to be easily mounted or removed. For the strip-shaped embodiment, the basket 64 may be oriented so that the catch portion 114 can be inserted through the apertures and then turned so that the straight portions rest within the apertures. The strip-shaped embodiment allows the connectors to be removed only by rotating the basket 64 under and forward toward the space beneath the primary basket when the stop element 116 is removed or disengaged. The connection of the secondary and primary baskets to the simple and compact support bar 58 ameliorates the positioning, the assembly, and removability of the secondary basket 64.

Figure 25:
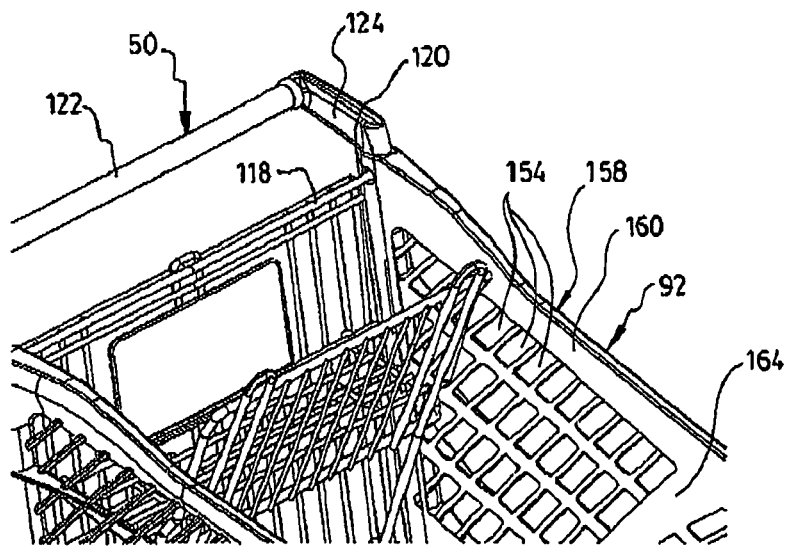
FIG. 25 is a top front perspective view of an upper back part of a shopping cart according to another embodiment of the present invention.

Referring to FIG. 25, the primary plastic basket 34 may be further connected to the frame at an upper part of the side walls. To this end, the uprights 44 include lateral apertures and the basket's tubular structural members include lateral holes aligned with corresponding apertures as appreciable in the figure. Securing means 118 are provided for securing the structural members 47 to the side uprights 44. The securing means 118 may include bolts, a rod, or other types of clips or inserts. Optionally, the securing means consist of a cylindrical beam that is inserted through both apertures and holes. The beam can form part of the rear wall of the basket, which is made of multiple metallic rods, and forms a pivot to allow the rear wall to swing forward when a previous shopping cart is pushed in for nesting. It should be noted that the securing means 118 may alternatively include two separate beam units for inserting through respective aligned aperture-hole pairs 120. The lateral apertures and holes are shown as facing inwardly, but they may alternatively face another direction and the securing means 118 may thus be adapted to the given orientation.

Preferably, the handle 50 includes a handle bar 122 and coupling components 124 for inserting within the respective tubular side uprights 44. Each coupling component may also include a lateral aperture for receiving the securing means 118 in order to secure the handle 50 to the side uprights 44.

Figure 22:
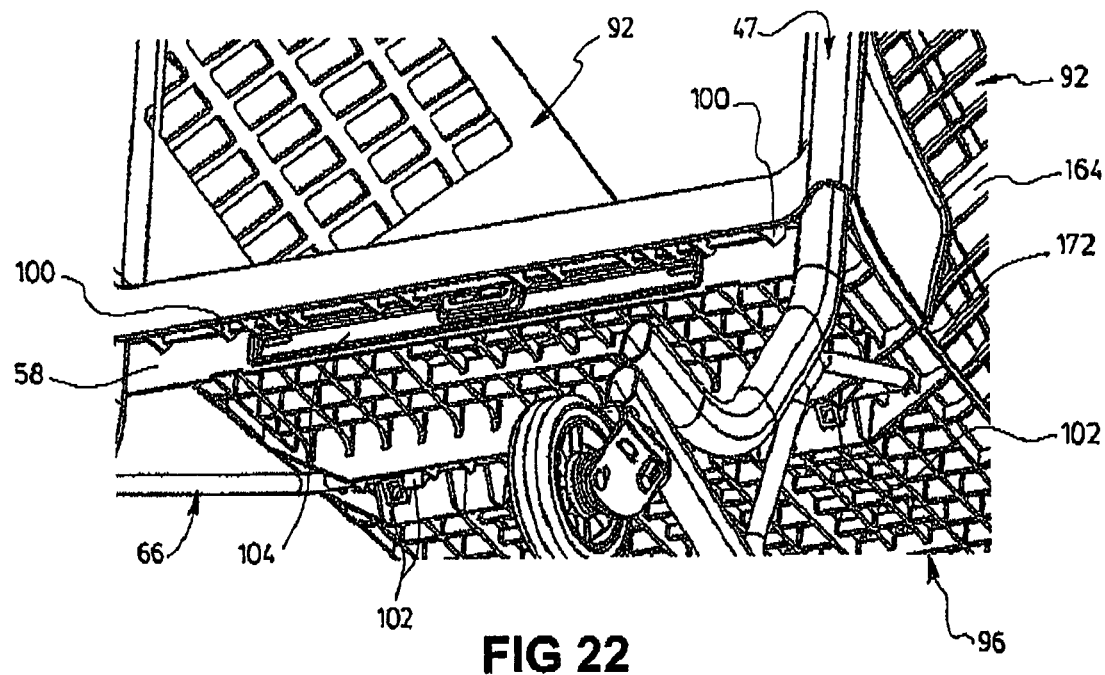
FIG. 22 is a bottom back perspective view of part of the back of the shopping cart according to another embodiment of the present invention.
Figure 23:
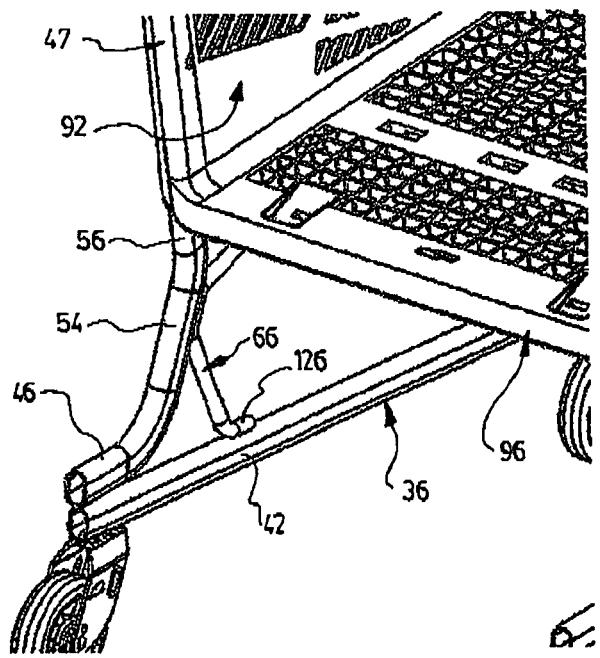
FIG. 23 is a top back perspective view of part of the back of the shopping cart according to another embodiment of the present invention.

Referring to FIG. 20-22, the primary basket 34 may also be supported on the frame with the help of the intermediate support 66. The intermediate support 66 may be mounted to the base 36 forward of the side uprights 44.

Referring to FIG. 20, one variant of the intermediate support has two ends 126 connected to the longitudinal framing members 42 and two angled parts 128 connected to the forward-slanting segments of the side uprights 44. In FIG. 21, the other variant of the intermediate support is of a simpler U-shaped design. Both variants have a cross bar 130 spanning the width of the base and directly contacting the primary basket 34.

Referring to FIGS. 20-22, the bottom of the primary basket 34 includes clamping means for removably connecting the primary basket to the cross bar 130. The clamping means can be similar to those used to engage the support bar 58. Each clamping means may include a series of pairs of opposed and off-set engaging elements 102. The engaging elements 102 receive the cross bar 130 between them and their protuberant ends partially enclosing around the shaft from below. The engaging elements are preferably resilient and allow snap-action entrapment of the cross bar 130.

Figure 24:
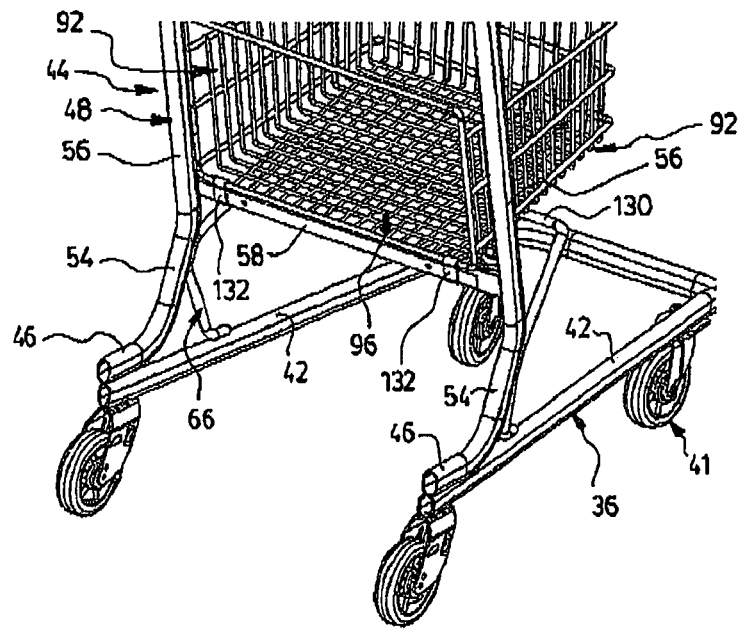
FIG. 24 is a top back perspective view of part of a shopping cart with a metal basket according to one embodiment of the present invention.

Referring now to FIGS. 24 and 26-30, a metallic primary basket 34 can also be mounted to the frame 32. FIG. 24 shows that the bottom rear of the metallic basket is mounted to the support bar 58 using clamps 132 and the bottom floor rests on the cross bar 130 of the intermediate support 66. At the top of the rear wall, a rod is secured to the side uprights 44. Further connection clips, clamps, brackets, welding, soldering and the like may also be used at various locations if desired, depending on the number and type of baskets.

Figure 9:
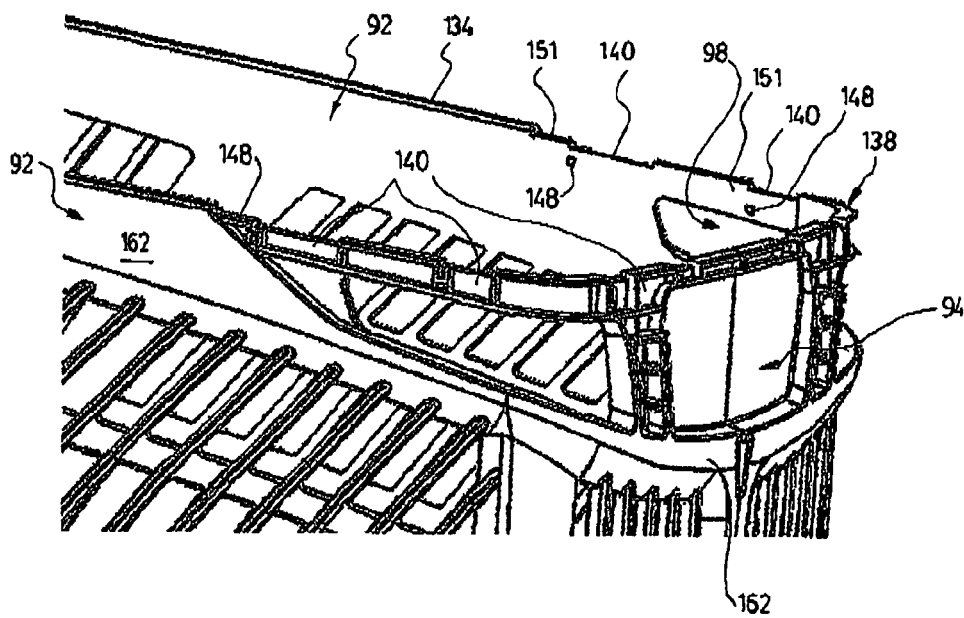
FIG. 9 is a close-up top perspective view of the front of a basket without an overlay, according to one embodiment of the present invention.
Figure 10:
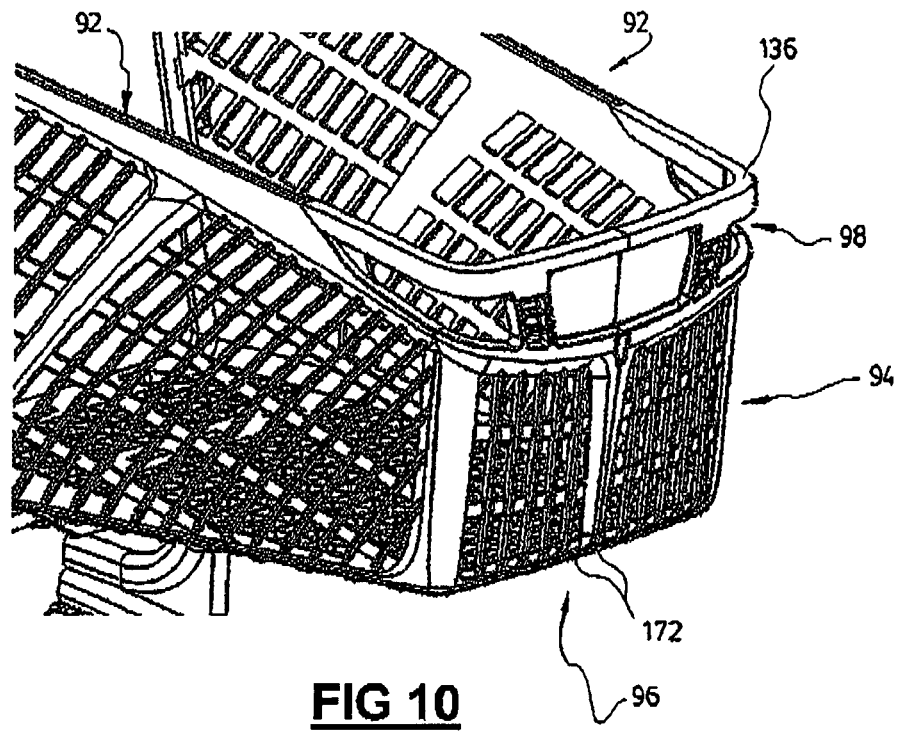
FIG. 10 is a close-up top front perspective view of the front of the basket of FIG. 9 with an overlay, according to one embodiment of the present invention.

Referring to FIGS. 1, 2, 6-8, and 10-12, the plastic shopping cart basket 34 is preferably modular and includes various components to improve functionality. The modular basket 34 has an upper edge 134 extending along the side walls and the front wall, the upper edge having a given thickness. FIGS. 6-8 and 10-12 show a channel-shaped overlay 136 covering at least a portion of the upper edge 134. FIGS. 1, 2 and 9 show the portion 138 of the upper edge 134 in greater detail.

Referring to FIGS. 6-8, 10-12 and 32a-32b, the overlay 136 is in a detachably snapped-on relationship with the portion of the upper edge 134. The overlay 136 has a generally U-shaped cross-section fitting on the portion and is sized so as to provide a gap between the overlay 136 and an outer surface of the portion of the upper edge when the overlay 136 is snapped onto the portion.

Referring to FIG. 9, the portion 138 of the upper edge also has at least one zone of connection 140 with a smaller thickness than the given thickness of the upper edge 134.

Preferably, the portion 138 extends along the upper edge of the front wall and part of each side wall to be generally U-shaped when viewed from above.

Figure 11:
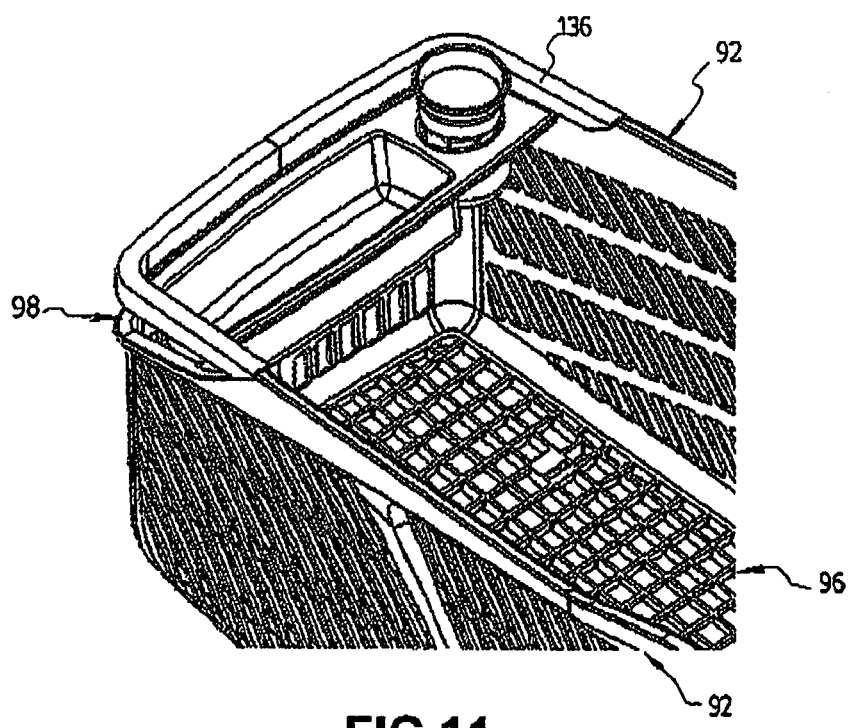
FIG. 11 is a close-up top back perspective view of the front of a basket with an overlay and a tray, according to one embodiment of the present invention.
Figure 12:
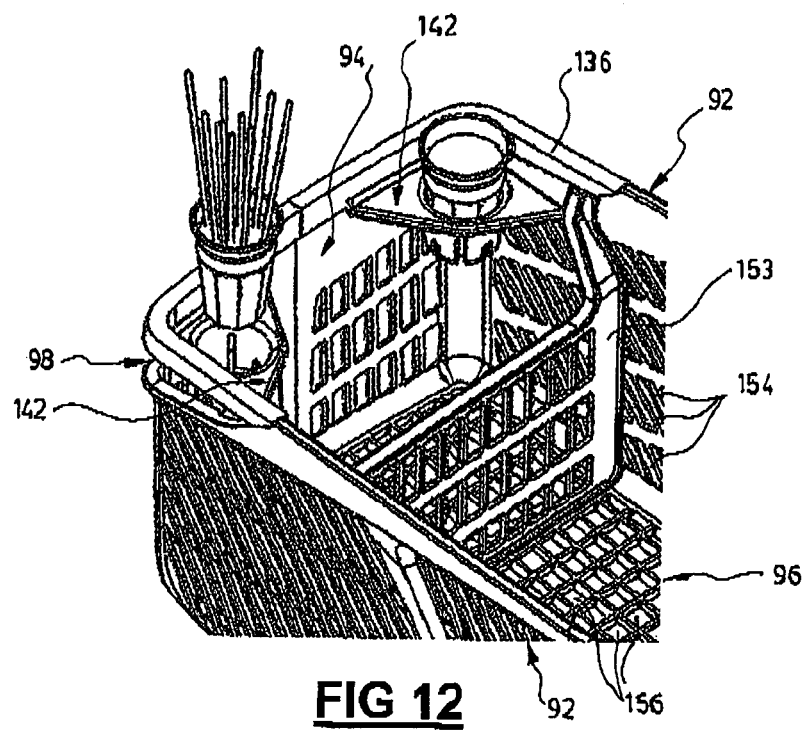
FIG. 12 is a close-up top back perspective view of the front of a basket with an overlay and various trays, according to one embodiment of the present invention.
Figure 13:
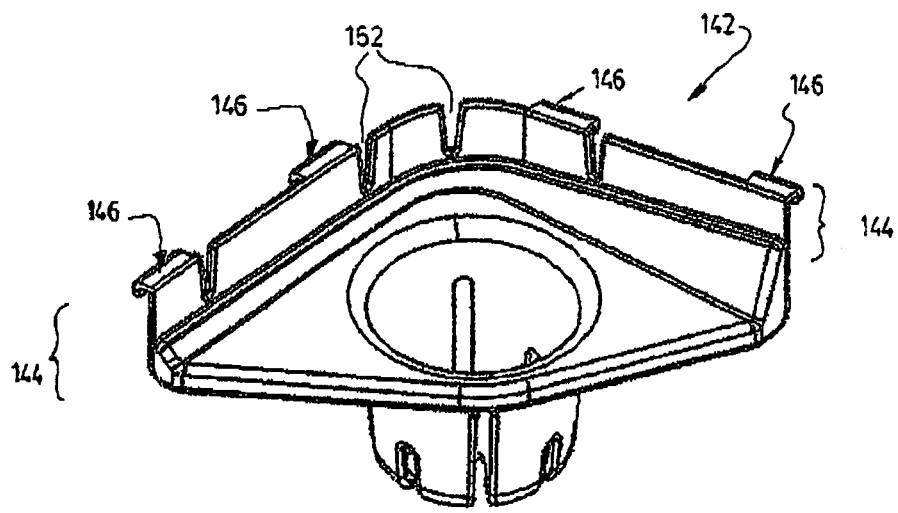
FIG. 13 is a top perspective view of a cup holder accessory according to one embodiment of the present invention.

Referring to FIGS. 11-13, there is also a tray 142 mounted between the overlay and the portion of the edge. FIG. 13 shows that the tray 142 has a rim 144 provided with hooks 146 connectable to the zones of connection to suspend the tray 142 from the upper edge. The rim 144 with the hooks 146 is sized to fit into the gap when the overlay is snapped on to the portion of the upper edge. The tray 142 may be a cup holder, a container, an auxiliary basket, a simple surface or any other type.

Figure 32A:
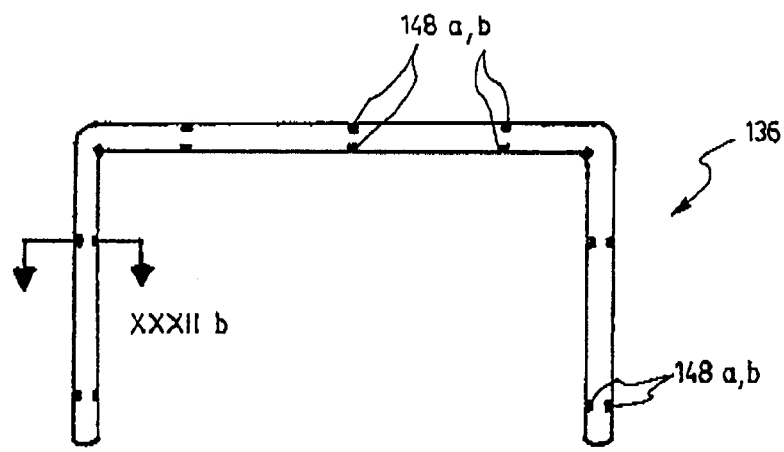
FIG. 32*a* is a bottom plan view schematic of the overlay according to an embodiment of the present invention.
Figure 32B:
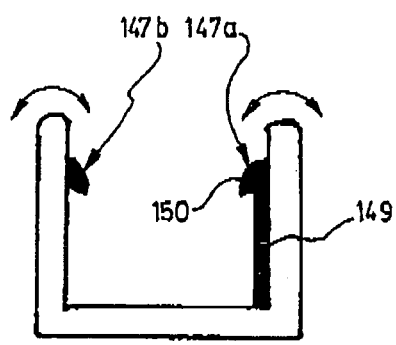
FIG. 32*b* is a transverse cut view schematic along line XXXIIb of FIG. 32*a*.

Referring to FIG. 32a, the overlay 136 includes multiple pairs of opposed snap elements 147a, 147b, Referring now to FIG. 32b, the elements are spaced apart along an inner surface of the overlay. Preferably, the overlay 136 is made of resilient material to enable its sides to be laterally biasable and to snap over the portion of the upper edge. The snap elements 147a, 147b may take on a variety of forms and are preferably composed of rigid plastic.

Referring now to FIG. 9, the portion 138 of the upper edge 134 comprises multiple pairs of opposed apertures 148 provided therealong. Each pair of snap elements is detachably snappable within each pair of apertures, to allow the snapped-on relationship between the overlay 136 and the portion 138. Preferably, each pair of apertures 148 is formed by a single conduit provided through the entire thickness of the portion of the upper edge. When the engaging elements are snapped into the apertures 148, they only project partially within the conduit.

Referring back to FIG. 32b, the snap elements 147a, 147b may have different forms. In this illustrated embodiment, an inner snap element 147a includes a flat ridge 149 with a hook-shaped end nob 150 and an outer snap element 148b includes a hook-shaped nob without the ridge. This configuration of snap elements allows improved fitting over the portion of the upper edge. Referring now to FIG. 9, when the overlay is snapped onto the portion 138 of the upper edge 134, the ridge of the inner snap element will abut along the flat inner surface 151 of the portion 138. On the other side, the outer snap elements will snap into the apertures 148 and the adjacent inner side of the overlay will abut on the outer surface of the portion 138. It should be understood that various shapes and configurations of snap elements and corresponding apertures and surfaces of the portion may be used.

Referring to FIG. 13, the tray 142 may have multiple V-shaped gaps 152 spaced along the rim 144 to align with the apertures. Thus, the snap elements pass through the V-shaped gaps 152 to engage with the apertures. The snap elements of the overlay snappingly engage the portion of the upper rim while the resilient sides of the overlay exert a clamping pressure against the rim of the tray 142. The tray 142 is thus held in suspension by its hooking over the zones of connection and by the clamping of the overlay. The overlay is easily mounted onto the portion by aligning it along the portion and pressing downward. The snap elements are shaped to slide downward and eventually snap into the apertures.

Referring to FIGS. 6-8 and 10-12, when there are slots 98 forming handles at the upper front corners of the basket 34, the overlay 136 is preferably sized to skirt an upper boundary of each slot 98.

Referring back to FIG. 9, the zones of connection 140 include a plurality of zones spaced-apart along the portion 138 of the upper edge 134 in a crenulation configuration. The regular spacing of the zones allows different trays to be interchangeably mounted thereon at various locations. Each hook of the tray fits over a corresponding one of the zones. The tray 142 of FIG. 13 has hooks arranged in a corner formation to be connectable at the upper corner of the basket. FIG. 9 shows that each spaced-apart zone 140 preferably includes an upper recess and a lateral recess that define a shape corresponding to the L-shaped hook of the tray. Preferably, the lateral recess is located on the outside part of the portion, so that the tray can be located within the cavity of the basket, the hook hooking over the outside.

Referring back to FIG. 13, the tray 142 has multiple L-shaped hooks 146 extending off the rim 144. The hooks 146 allow the tray 142 to be suspended from the portion of the upper edge without the overlay. Various different trays may be arranged in different configurations on the portion of the upper edge while the overlay is off. Once the trays are resting on the portion, the overlay may be installed to further secure the trays in place and provide a smooth surface along the upper edge. Thus, the hooks facilitate easy assembly of the trays on the upper edge and allow the overlay to be simply constructed.

FIG. 12 shows another type of basket accessory, a divider 153, which may be connected to a zone of connection and to other parts of the basket.

Referring to FIG. 12, the walls of the basket may include a lattice of solid plastic with a plurality of parallelogram-shaped lattice gaps 154. The divider 153 is mountable within the cavity and has a projection (not shown) on its side edge to cooperate with one of the lattice gaps. The projection may have a corresponding parallelogram shape to help secure the divider across the cavity.

The bottom of the basket may also include a plurality of square-shaped lattice gaps 156 and the bottom edge of the divider may include clips (not shown) mountable within the corresponding lattice gaps 156.

Referring to FIG. 1, the basket 34 preferably includes a molded one-piece structure made of injection molded plastic. The one-piece structure preferably includes the side walls 92, front wall 94 and bottom floor 96. The structure has tubular zones 158 of hollowed plastic, each tubular zone having an annular cross-section with a peripheral wall. The tubular zones include a main tubular section 160 with opposed ends and at least a first branching tubular section 162 and a second branching tubular section 164 connected to one of the ends of the main tubular section 160 in a bifurcated relationship. The peripheral wall of the first branching section 162 has a greater thickness than the peripheral wall of the second branching section 164.

These tubular sections 160, 162 allow not only improved efficiency of plastic by removing excess plastic from their interior but also tailored strengthening of the tubular sections that require thicker walls at specific locations.

For instance, in FIG. 1 one main tubular section 160 extends longitudinally along a rear part of the upper edge 134 of each of the side walls 92, the first branching tubular section 162 extends longitudinally forward from the main section 160 along the upper edge 134, and the second branching section 162 extends downward from the upper edge 134 to the bottom floor, optionally at a rearward oblique angle. In FIG. 1, the first branching section 162 extends around to the front wall 94 and downward along the front wall to the bottom floor. The tubular section 162 extending to the front wall provides columnar reinforcement at this location. The thickness of the first branching section 162 may be greater since the upper edge is where forces, shocks, impacts and wear are likely to occur, whereas the second branching section 164 forms a structural column for the side wall and will be exposed to a lesser amount of disturbances. It should be understood that many different branching configurations are possible and the basket may be molded so that the wall thicknesses and thickness differences between branching sections can fulfill various functions.

For instance, some tubular sections may act as shock absorbers which bend under impact and then return to their initial form, while others may have high rigidity. Providing tubular sections at the top also makes the basket less top-heavy.

FIGS. 31a-31f show various embodiments of possible tubular section configurations. The branching sections may be of various sizes and there may be more than two branching sections as in FIG. 31e where there are two additional branching sections 164', 164".

The cross-sectional shape of the tubular sections may also vary. In FIG. 1 it may be appreciated that in cross-section the main tubular section 160 and the first branching section 162 are each higher than they are wide. This allows improved resistance against top-side impacts and forces and increases the moment of inertia in that direction. The cross-sectional shape may otherwise be circular, oval, square, rectangular, or other shapes for a given functionality. It should be noted that the inner surface of the tubular sections is generally smooth and is often substantially oval in cross-section due to the gas injection technique that is used. In some embodiments, the first branching section 162 has an outer surface that is rectangular-shaped with rounded corners in cross-section, and the second section 164 has an outer surface that has a trapezoid shape in cross-section. The trapezoid has parallel inner and outer sides, the inner side being longer than the outer side.

Figure 31A:
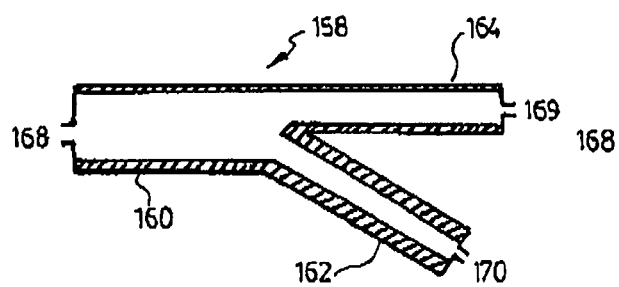
FIGS. 31*a*-31*f* are side cut view schematics of different variants of tubular zones of hollowed plastic for a shopping cart basket, according to an embodiment of the present invention.
Figure 31B:
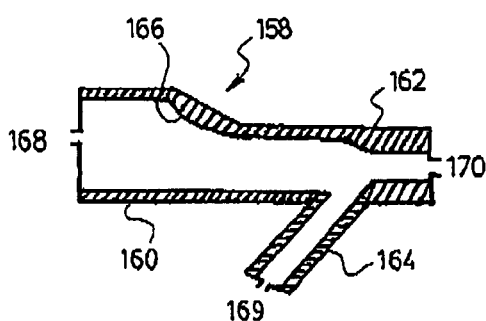
Figure 31C:
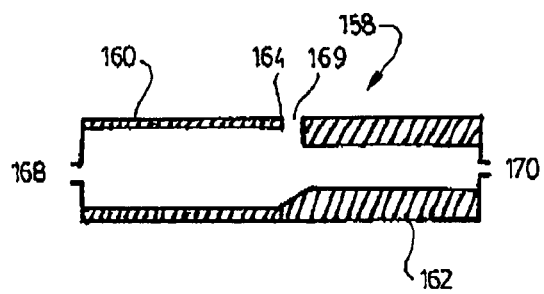
Figure 31D:
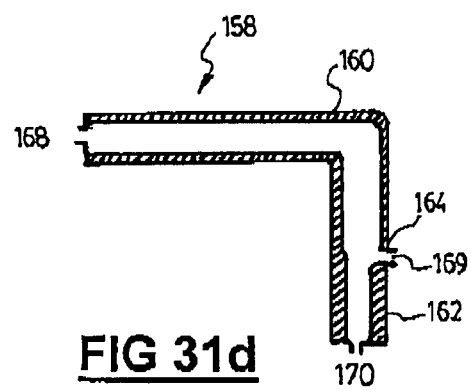
Figure 31E:
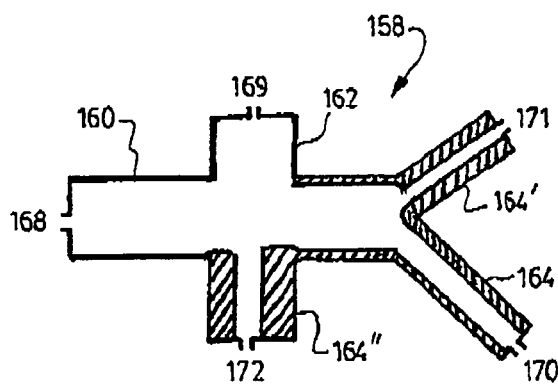
Figure 31F:
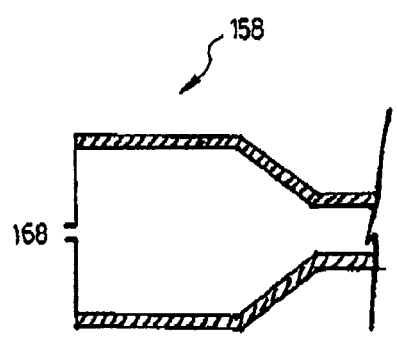

The tubular sections 160, 162, 164 may also vary in cross-sectional shape or size along their length. Reducing the size as shown in FIG. 31b may lead to an accumulation 166 of solid plastic. Thus, the size can be varied on purpose to achieve accumulation for reinforcement purposes. FIG. 31f shows a substantial variation in the internal tubular diameter of a section. In the larger part the flow velocity of the molten plastic would be less than the flow velocity in the smaller part. This may also influence the gas pressure that is required among other operating parameters.

FIGS. 33a-37b show linear simulations of the total deformation at locations of shopping cart baskets in response to loads applied at specific locations. It should be noted that the wall thicknesses of all tubular sections were taken to be $\frac{3}{16}$ inch in the simulations. It should also be noted that the plastic of the baskets may exhibit nonlinear deformation in reality and thus the true values may exceed those achieved in the simulation.

Figure 33A:
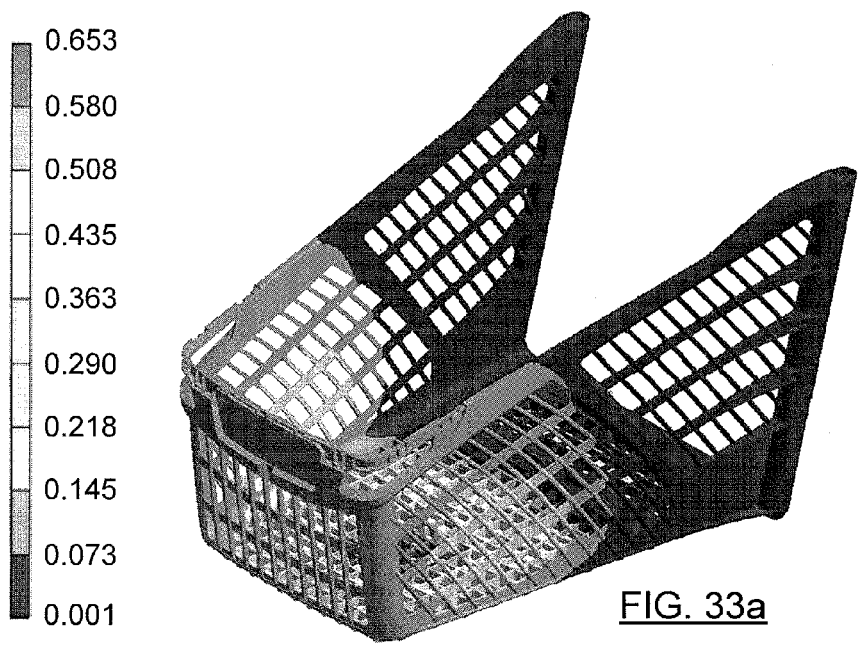
FIGS. 33*a*-37*d* are various perspective views of plastic shopping cart baskets showing simulation results of deformation or stress at various positions due to forces applied at specific locations.
Figure 33B:
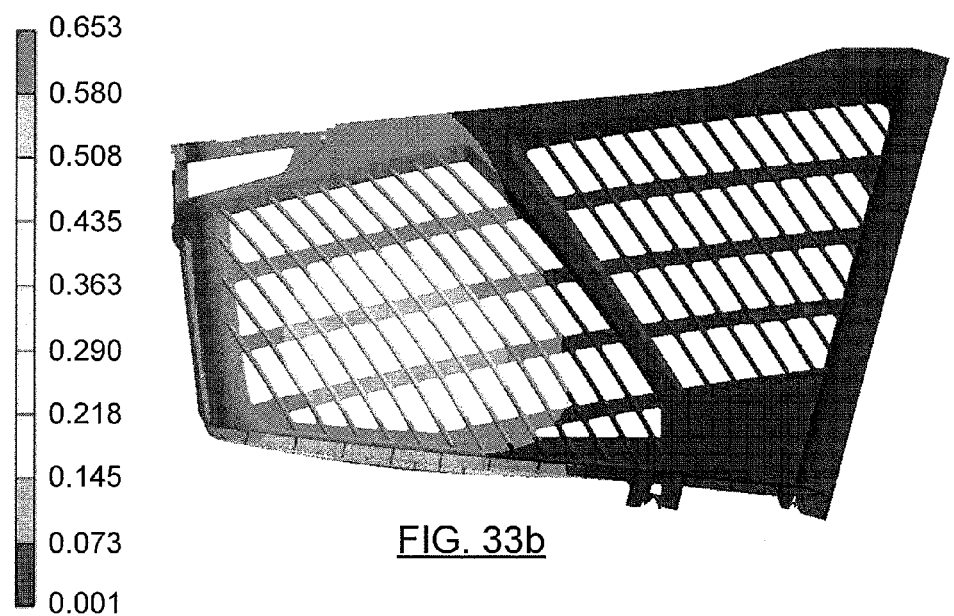

In FIGS. 33a-33b, a downward load of 562 lbs is uniformly distributed on the surface of the bottom of the basket.

Figure 34A:
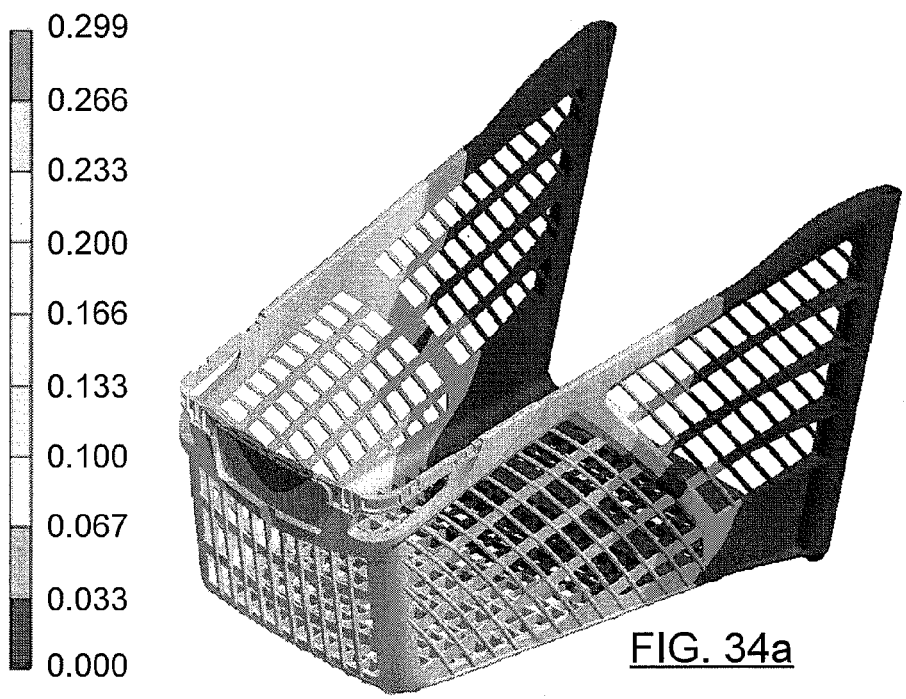
Figure 34B:
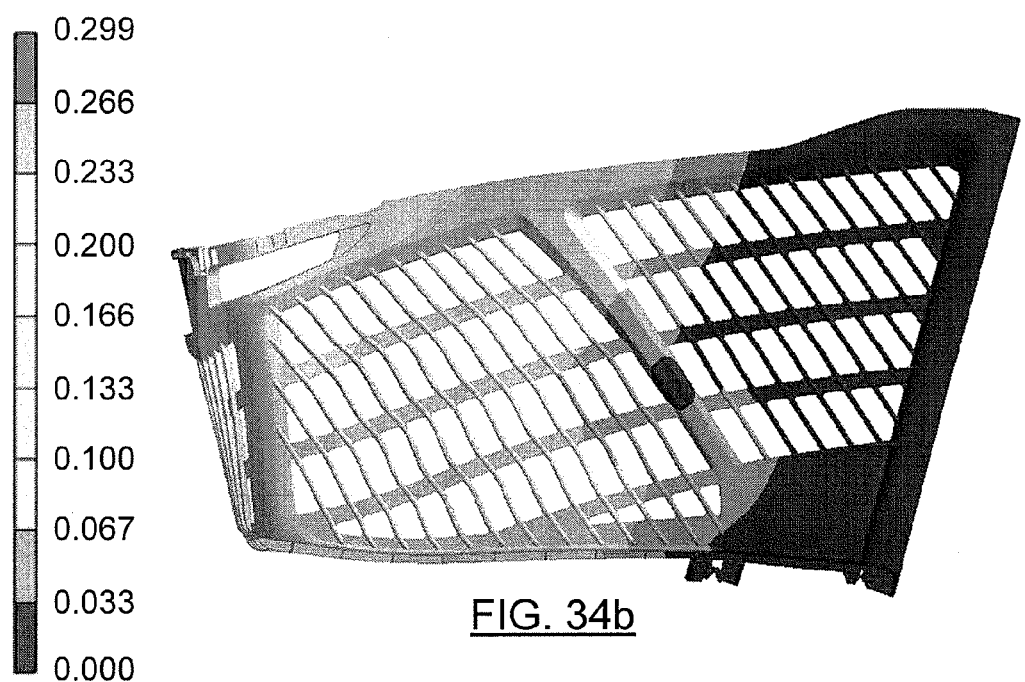

In FIGS. 34a-34b, a downward load of 250 lbs is applied at the center of the top front end of the basket.

Figure 35A:
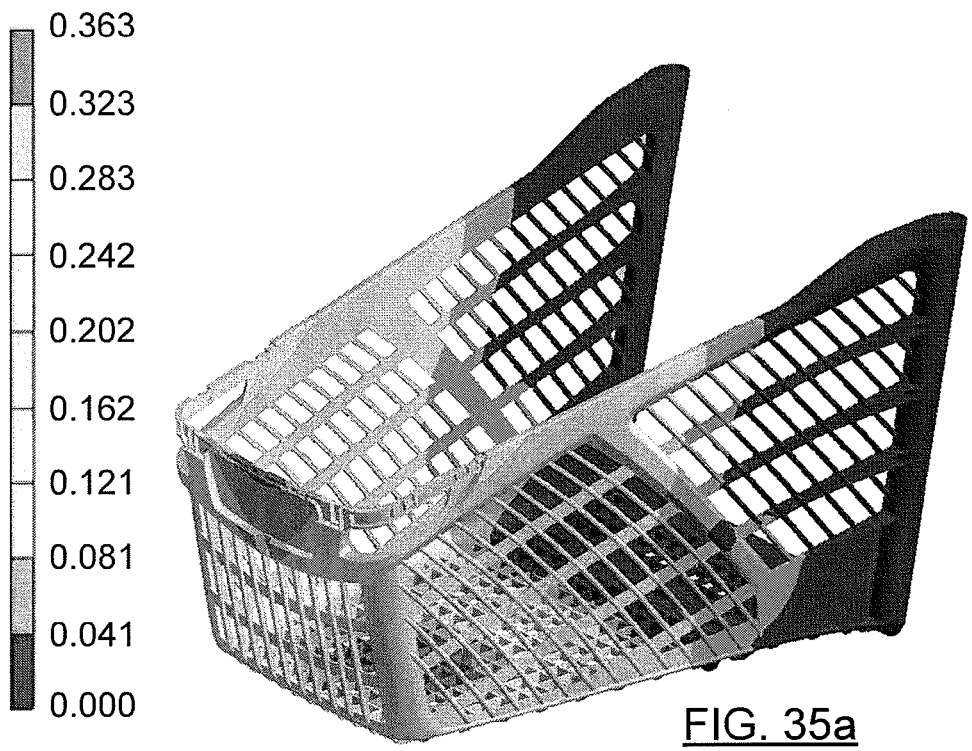
Figure 35B:
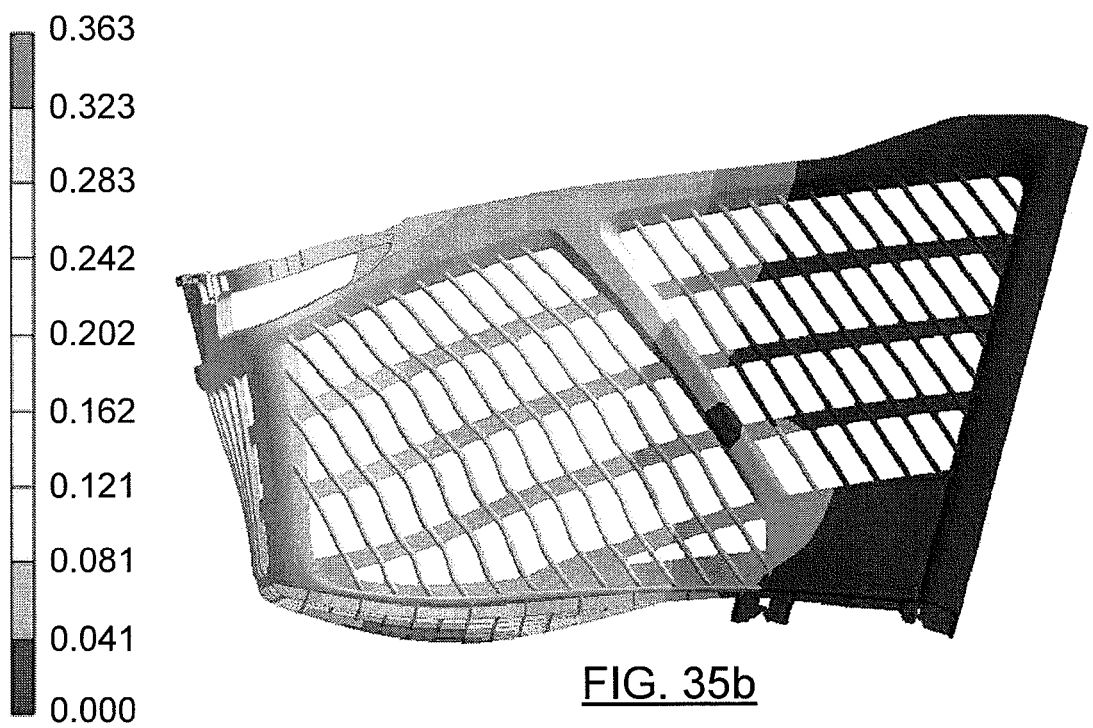

In FIGS. 35a-35b, a downward load of 250 lbs is applied at the center of the top front end of the basket and a downward load of 200 lbs is uniformly distributed on the surface of the bottom of the basket.

Figure 36A:
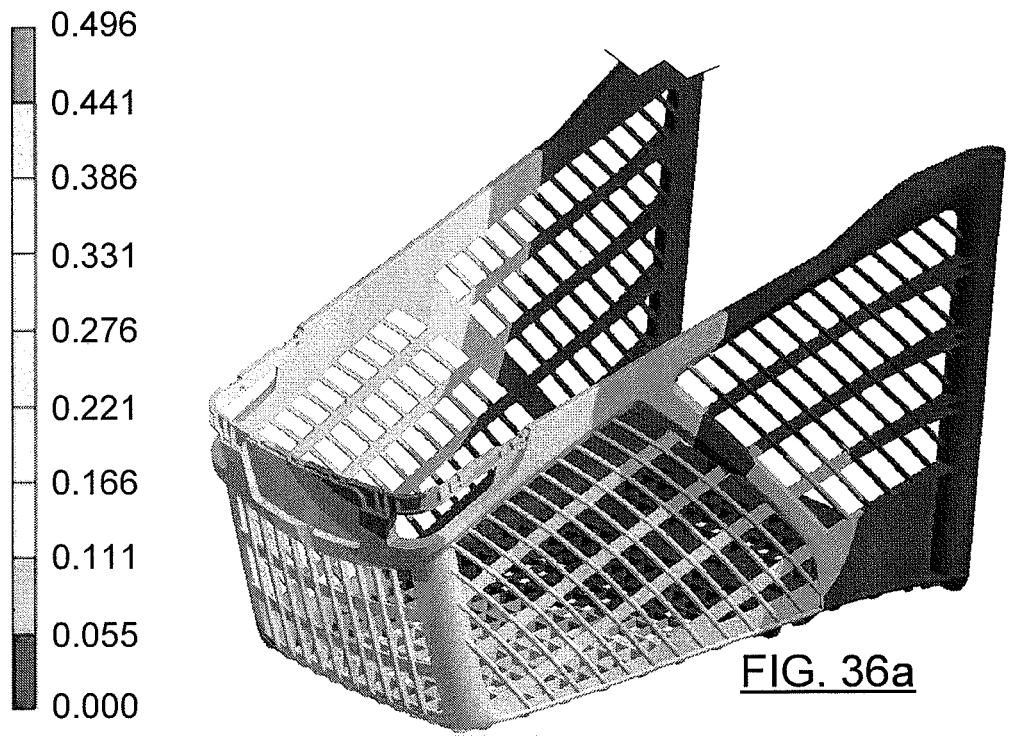
Figure 36B:
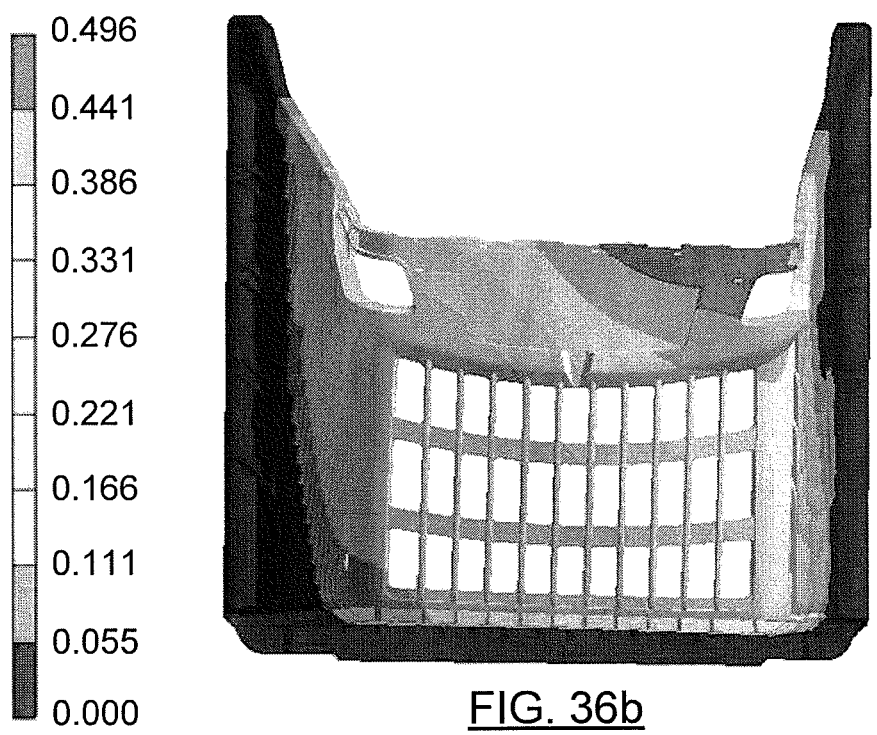

In FIGS. 36a-36b, a downward load of 250 lbs is applied at the corner of the top front end of the basket.

Figure 37A:
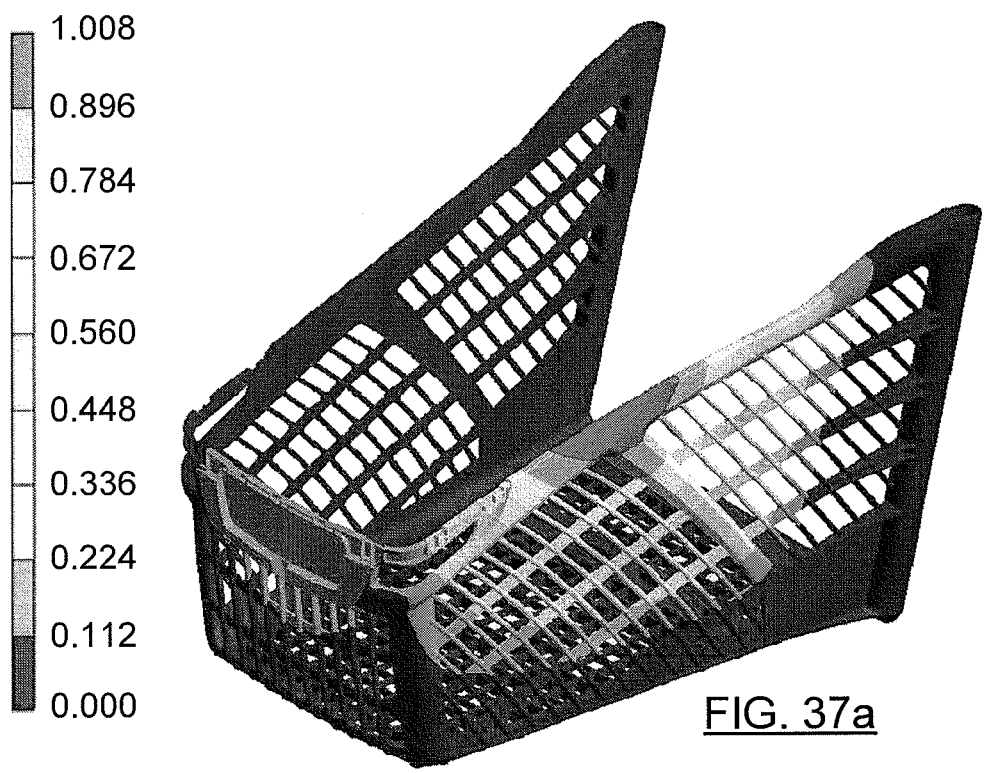
Figure 37B:
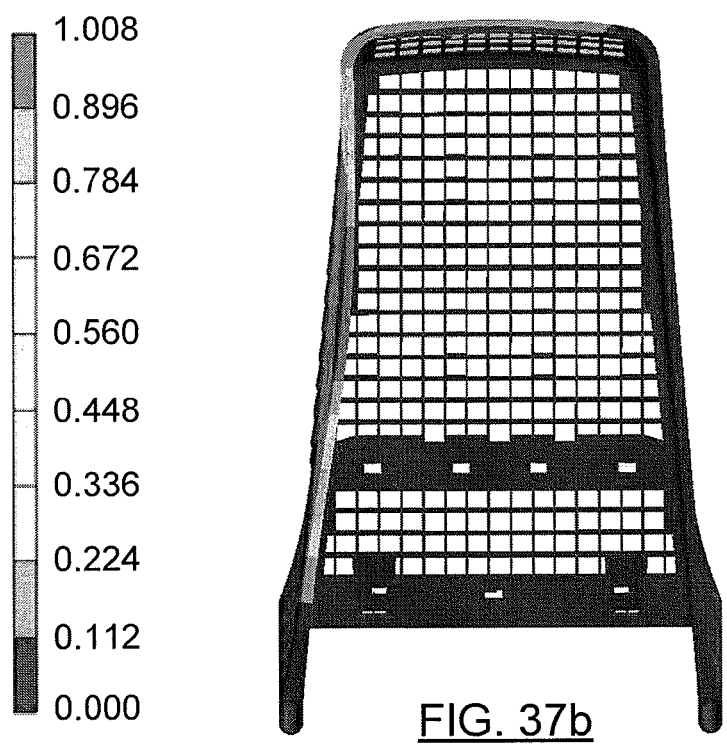

In FIG. 37a-37b, a lateral load of 35 lbs is applied at the intersection of the tubular branching sections of one of the side walls of the basket.

Figure 37C:
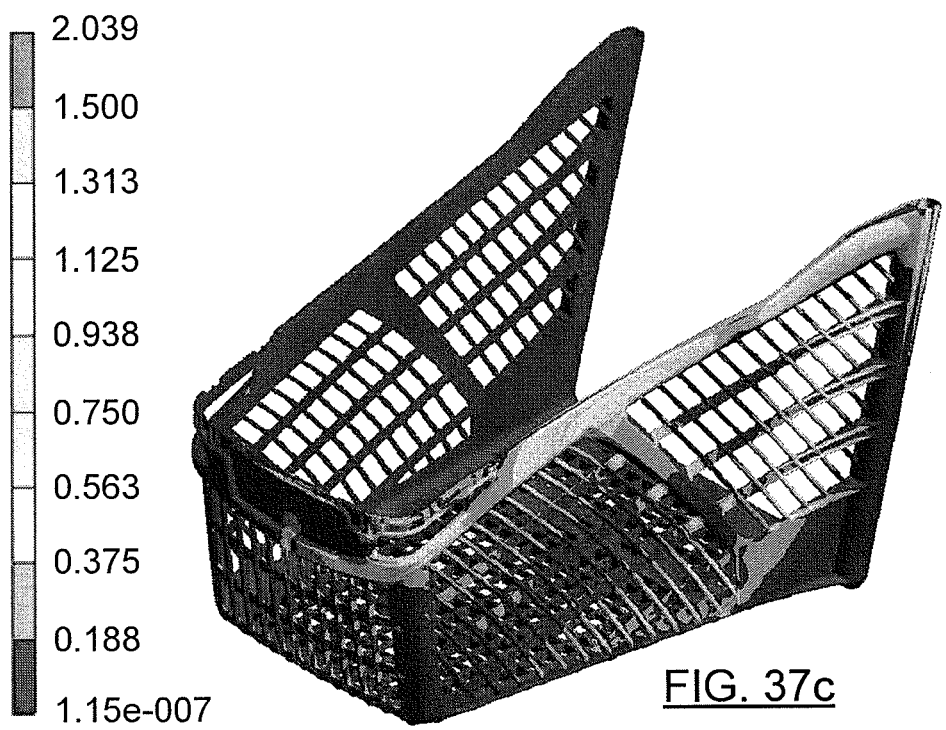
Figure 37D:
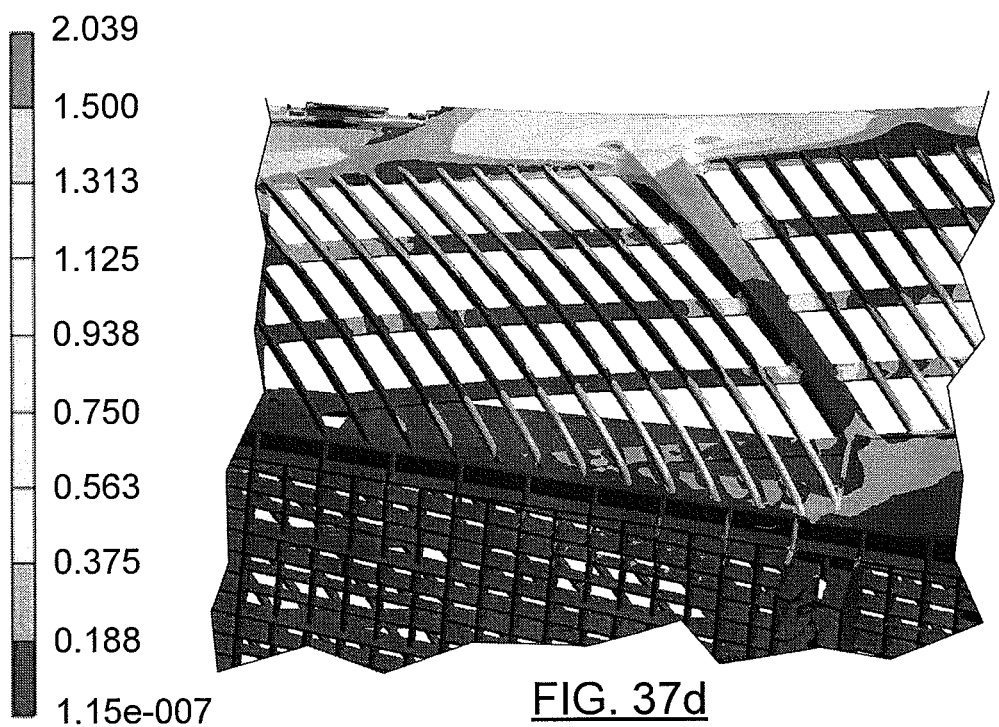

FIGS. 37c-37d show simulations of the equivalent (von-Mises) stress at locations of the shopping cart basket in response to the same load conditions as FIGS. 33a-33b. The units are in $10^3$ psi.

In light of such deformation and equivalent stress data, the tubular sections 160,162,164 may be tailored to reinforce specific locations of the shopping cart basket that may be prone to damage, wear, or particular operational demands.

Providing different wall thicknesses to the first and second branching sections may be enabled by using a method incorporating "independent gas-assisted injection".

In one embodiment of the method for injection molding the one-piece plastic shopping cart basket, a mold (not shown) is provided. The mold has a cavity in the shape of the shopping cart, and includes a gas inlet and at least first and second gas outlets. FIGS. 31a-31e show the inlet 168 and the first 169 and second 170 outlets. There may also be third 171 and fourth 172 outlets as in FIG. 31e. The mold cavity has a tubular-zone making portion in fluid communication with the gas inlet and the gas outlets.

Initially, the gas inlet and the gas outlets are closed and molten plastic is injected into the mold. A sufficient amount of time elapses to allow the molten plastic to partially solidify in the tubular zone-making portion of the cavity to form a solidified tubular zone with molten plastic still inside it. The plastic will commence solidifying from the outside toward the inside at a rate depending on the temperature difference, the shape of the cavity, the heat transfer properties of the mold and the plastic, among others.

While molten plastic still remains in the tubular zone, a gas such as air is injected via the inlet and the two gas outlets are operated in an independent manner to vary the flow of plastic in their respective sections of the tubular-zone making portion of the cavity.

When the first gas outlet is opened, the gas pushes the molten plastic located in a section between the gas inlet and the first gas outlet along the path of least resistance to be expelled out of the first gas outlet. This forms a first tubular section having a given thickness, since the plastic lining the mold in that section has solidified.

When the second outlet is opened, the injected gas pushes the molten plastic located in the section between the gas inlet and the second gas outlet to be expelled out of the second gas outlet. This forms a second tubular section having a peripheral wall with a thickness greater than the given thickness.

The plastic remaining in the mold is then left to further cool and solidify to form the basket.

It should be understood that the first and second gas outlets can be controlled in a variety of ways to vary and control the expulsion of molten plastic. They may be operated simultaneously by controlling the respective exit pressures and thereby allowing different plastic flow rates. They may alternatively be operated in a sequential manner, re-closing the one before opening the other. The gas inlet pressure may also be varied to control the flow rate of the molten plastic. Preferably, the gas inlet remains open to pressurize the tubular section-making zone throughout the process.

Each of the gas outlets may include a hydraulic cylinder (not shown) that is actuated between a range of open and closed positions. The hydraulic cylinders may be connected to an electronic control system (not illustrated) in order to precisely control the timing and rate of expulsion of the molten plastic.

Once the tubular sections are formed and solidified, a plastic cap (not shown) may be placed over the inlet and outlet openings to effectively seal the tubular zones and give the basket a finished appearance. The caps may be small plastic disks that are bonded in place. The inlet and outlet openings of the tubular sections may be located at the bottom of the basket and/or facing downward, in order to hide them from view and make the cap less exposed to food debris and the like.

FIGS. 1, 31a-31f and 33a-37d show several variants of possible tubular sections formed by the above-described method. The tubular sections may be oriented with respect to one another in various configurations and angles and may extend along various parts of the basket. In the illustrated embodiments, each lateral half of the basket has one gas inlet and two gas outlets, but other configurations are also possible.

The cycle time for producing such baskets is in the range of a few minutes and the gas-injection portion occurs in over a few seconds.

Referring now to FIGS. 1 and 28-30, there is also an embodiment of a modular method for manufacturing different shopping cart models.

Figure 29:
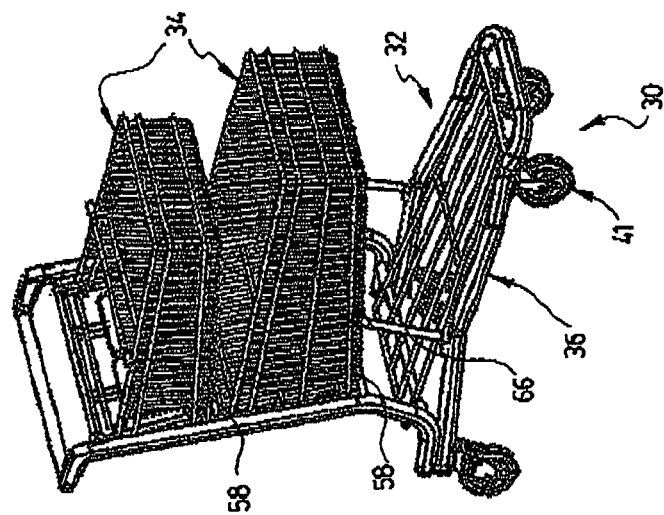
FIG. 29 is a top front perspective view of another shopping cart model, according to an embodiment of the present invention.
Figure 28:
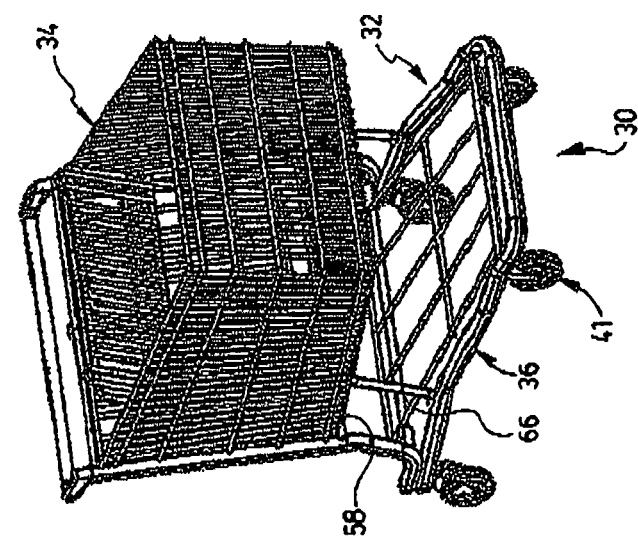
FIG. 28 is a top front perspective view of one shopping cart model, according to an embodiment of the present invention.

Multiple sets of base modules 36 are provided. The tubular framing member 42 of each base module has a rear with an upward-facing mounting surface. The base modules 36 of each set has a different pre-determined width between the longitudinal tubular framing members 42 and/or a different pre-determined length of the longitudinal tubular framing members 42. FIGS. 28 and 29 show base modules with different widths.

Figure 30:
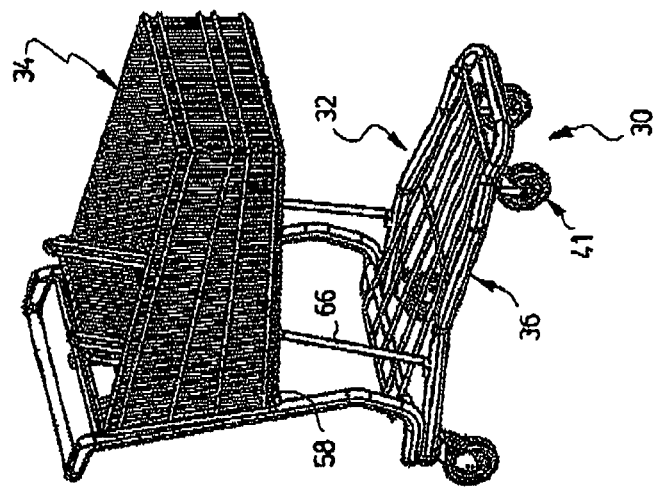
FIG. 30 is a top front perspective view of yet another shopping cart model, according to an embodiment of the present invention.

At least one set of tubular side uprights are also provided. The bottom portion of each tubular side upright has a downward-facing mounting surface (not illustrated, shown as already joined with the upward-facing mounting surface). FIGS. 28-30 only show one type of side upright 44, all of which have the same configuration and size. It is possible to provide several sets of side uprights, each having a different height, size or configuration.

A base module 36 is selected from each of the different sets. For each selected base module 36, any pair of tubular side uprights is selected. Indeed, even when there are several sets, any pair from a single set will do. For each selected base module 36, the mounting surfaces of the selected pair of tubular side uprights 44 with the respective mounting surfaces of the selected base module 36, and the mounting surfaces are secured together so that the upper portions of the selected tubular side uprights extend upward from the base module in parallel relation to each other.

The pair of side uprights 44 is not formed from an integral tubular piece, which enables various models of shopping carts to be assembled with greater ease and simplicity. The downward-facing and upward-facing mounting surfaces further enable easy, simple and efficient construction of the different models. Not only can the base and upright components be easily mounted to each other, but they can also be easily produced from tubular stock. Preferably, the tubular base module and the tubular side uprights have a cross-sectional shape that is rectangular with rounded corners. In such a case, the mounting surfaces are both generally rectangular strip shaped, which facilitates alignment and joining together.

Again for each selected base module, at least one shopping cart basket is mounted to the tubular side uprights. FIG. 28 shows a wide basket 34 mounted to the uprights for a corresponding wide base module, whereas FIG. 29 shows a thinner base module and corresponding thinner baskets.

Providing base modules and independent side uprights that are interchangeable between different shopping cart models also allows a reduction in component inventory and facilitates assembly.

It should be understood that different configurations of base modules may also be provided. For instance, the configurations shown in FIGS. 1, 26 and 27 are different though they may have the same width. Preferably, each base module of each set is U-shaped viewed from above and they preferably have a configuration as shown in FIGS. 28-30.

Also preferably, the tubular side uprights have the configuration shown in the Figs, and the different sets may each have a different pre-determined height. It is possible, for example, that only the rearward slanting segment of the uprights has different lengths, while the bottom portion and the forward slanting segment remain the same from set to set.

Figure 4:
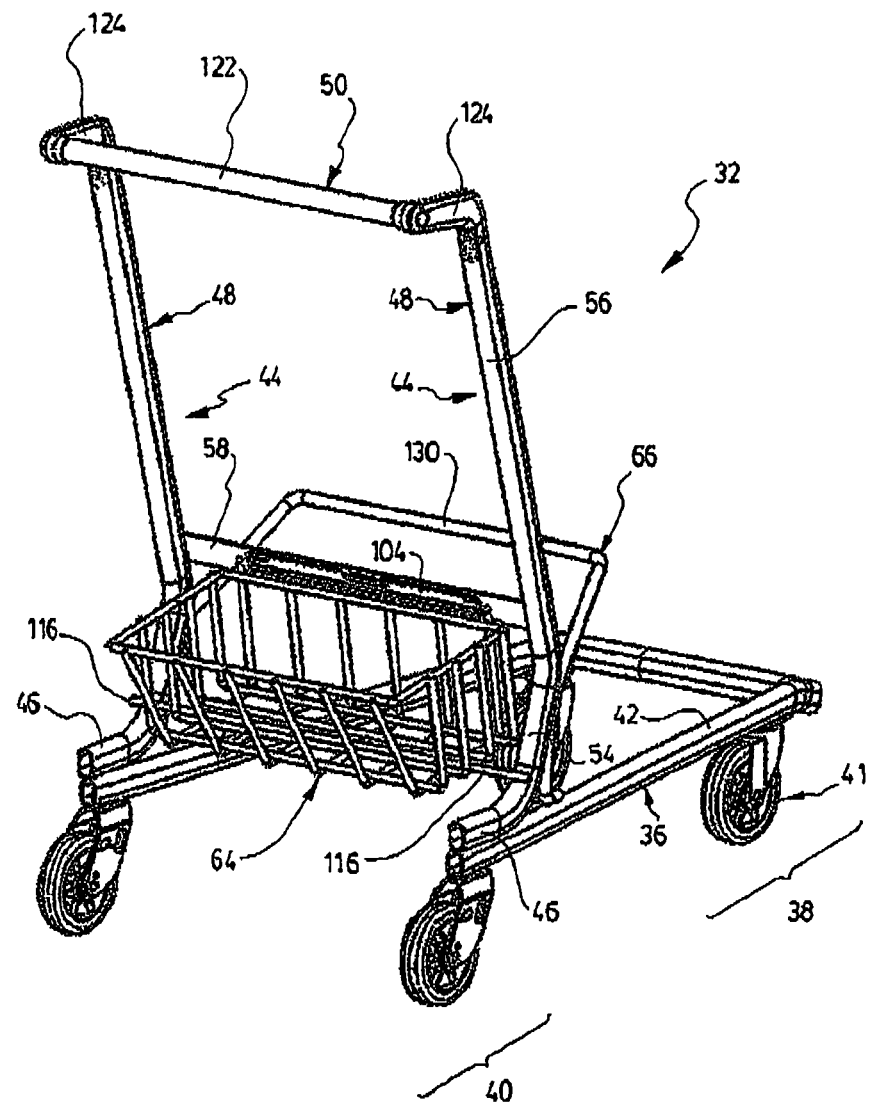
FIG. 4 is a top back perspective view of the frame of FIG. 3.
Figure 5:
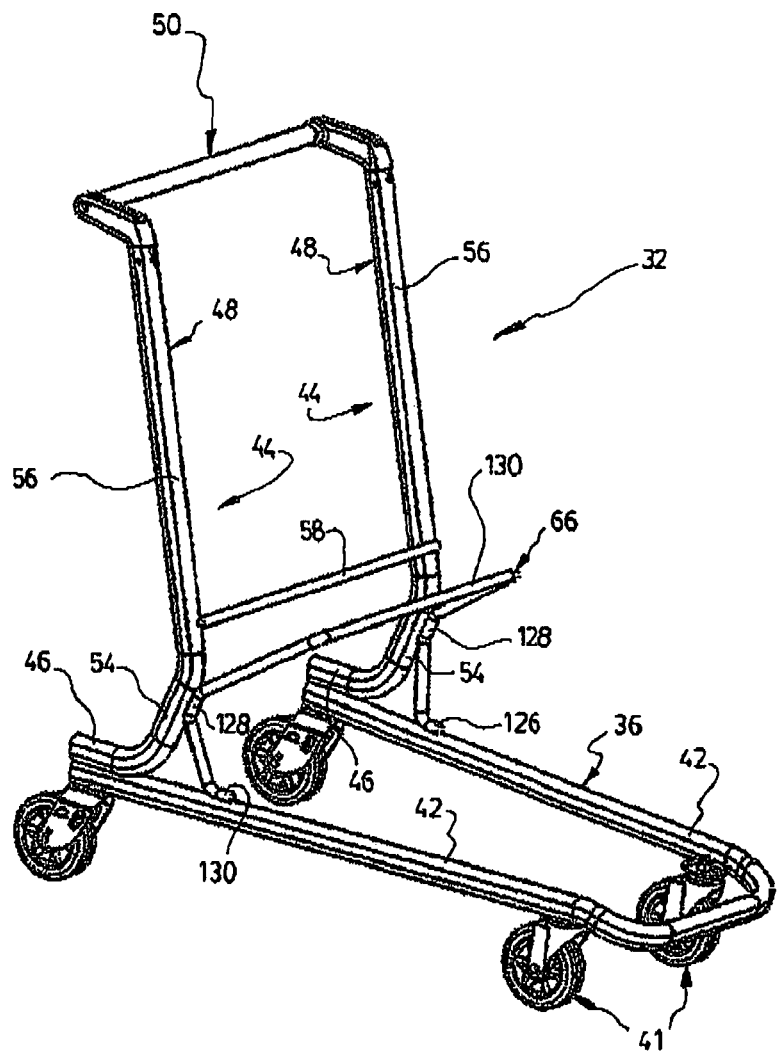
FIG. 5 is a top front perspective view of a frame of the shopping cart according to yet another embodiment of the present invention.

The lower surface of the bottom portion 46 forms the downward-facing mounting surface. The bottom portion of each upright is aligned and secured in parallel and contiguous relationship with each tubular framing member. The back edges of the bottom portions and the tubular framing members are preferably aligned to be generally coplanar as shown in FIG. 4 for example, but they may also be off-set as shown in FIG. 27. When a selected base module has a tapered configuration, the side uprights may be secured to it at a given location along its length to define the width separating the side uprights. The location may be chosen based on the size and availability of other components of the cart, such as the handle bar, support bar, intermediate support, basket(s), etc.

The modular method may also include providing a set of the mounting bracket units for mounting caster wheels to the base modules. Since each mounting bracket unit is associated with a single castor wheel assembly, it may be preferable to provide a single set of units. The units can be used to mount caster wheels assemblies at many locations along the tubular base module, be it along the longitudinal framing members or the front framing member.

In addition, multiple sets of handle bars may also be provided. The handle bars of each set have a different pre-determined length matching a corresponding one of the different pre-determined widths of the base modules. Multiple pairs of coupling components are also provided for coupling the handle bars to the pairs of tubular side uprights. The handle bar matching the selected base modules is selected and, for each selected base module, one pair of the coupling components is mounted to respective ends of the selected handle bars and to respective upper portions of the selected tubular side uprights. The coupling components can be mounted to the respective selected tubular side uprights after the uprights are secured to the selected base module and preferably after the basket has been mounted by sliding its structural tubular members over the uprights. The coupling components thus cap the tops of the uprights and help to confine the basket on the uprights.

Furthermore, multiple sets of support bars may be provided. The support bars of each set have a different pre-determined length matching a corresponding one of the different pre-determined widths of the base modules. At least one support bar is selected for matching with each of the selected base modules. FIGS. 18 and 19 show different configurations of the strip-shaped embodiment of the support bar, while FIG. 17 shows the simpler rod-shaped embodiment. For each selected base module, at least one support bar is mounted between the selected tubular side uprights above their bottom portions. FIGS. 28 and 30 show a single support bar mounted to the uprights at different heights for supporting a single corresponding basket. The baskets have different depths for each of the different heights at which the support bars are mounted. FIG. 29, on the other hand, shows two support bars mounted in vertically spaced relation on the same pair of side uprights, in order to support two baskets. The baskets also have different lengths to have a cascading arrangement relative to one another. Mounting the support bars to the rearward slanting segments of the uprights facilitate such a cascading arrangement.

In fact, multiple sets of shopping cart baskets may be provided and the baskets of each set may have a different pre-determined width matching a corresponding one of the different pre-determined widths of the base modules and/or a different pre-determined depth. The basket(s) are selected in order to match with the selected base module and the shopping cart model to be assembled.

It should be understood that it is possible to make many different combinations of different types, designs, models and constructions of the various shopping cart components, such as the base, the side uprights, the support bar, the intermediate support, the handle assembly, the wheel mounting bracket units, and others described herein or added hereto, some of such types, designs, models and constructions having not been explicitly illustrated in the figures, without departing from what has actually been invented.

The invention claimed is:

1. A shopping cart comprising:
a frame having:
    a wheeled base;
    a pair of side uprights each having a bottom portion mounted to a rear section of the base and an upper portion extending upward from the base;
a basket comprising a bottom floor, a front wall, two sidewalls and a tubular structural member framing a rear end of each of the two sidewalls, each tubular structural member slidably sheathing a corresponding one of said side uprights;
securing means for securing the tubular structural members to the side uprights;
a handle assembly mounted between the side uprights in the upper portion thereof;
each tubular structural member has a hole provided therein and each of the side uprights has an aperture provided therein and aligned with a corresponding one of the holes, and the securing means are slotted within the holes and apertures;
the securing means comprise a cylindrical beam spanning between the side uprights and removably slotted within each hole and each aperture;
each side upright further comprises a top extremity protruding upward out of the corresponding tubular structural member and wherein the handle assembly comprises a handle bar and two coupling components respectively mounted to opposed ends of the handle bar and the top extremities; and
a support bar mounted to the side uprights above the base and extending therebetween to support the bottom floor of the basket.

2. A shopping cart comprising:
a frame having:
    a wheeled base;

a pair of side uprights each having a bottom portion mounted to a rear section of the base and an upper portion extending upward from the base;

a basket comprising a bottom floor, a front wall, two sidewalls and a tubular structural member framing a rear end of each of the two sidewalls, each tubular structural member slidably sheathing a corresponding one of said side uprights;

securing means for securing the tubular structural members to the side uprights;

a handle assembly mounted between the side uprights in the upper portion thereof;

each tubular structural member has a hole provided therein and each of the side uprights has an aperture provided therein and aligned with a corresponding one of the holes, and the securing means are slotted within the holes and apertures; and the basket has a rear wall that is composed of metal rods one of which comprises the securing means.

3. The cart of claim 2, wherein securing means comprise a cylindrical beam spanning between the side uprights and removably slotted within each hole and each aperture.

4. The cart of claim 3, wherein each side upright further comprises a top extremity protruding upward out of the corresponding tubular structural member and wherein the handle assembly comprises a handle bar and two coupling components respectively mounted to opposed ends of the handle bar and the top extremities.

\* \* \* \* \*